US012541169B2

(12) United States Patent
Yamamoto et al.

(10) Patent No.: US 12,541,169 B2
(45) Date of Patent: Feb. 3, 2026

(54) IMAGE FORMING APPARATUS

(71) Applicant: CANON KABUSHIKI KAISHA, Tokyo (JP)

(72) Inventors: Shoji Yamamoto, Kanagawa (JP); Hiromi Fujinaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/484,714

(22) Filed: Oct. 11, 2023

(65) Prior Publication Data

US 2024/0126203 A1 Apr. 18, 2024

(30) Foreign Application Priority Data

Oct. 12, 2022 (JP) ................................ 2022-164244

(51) Int. Cl.
*G03G 21/16* (2006.01)
*G03G 15/01* (2006.01)

(52) U.S. Cl.
CPC ..... *G03G 21/1633* (2013.01); *G03G 15/0105* (2013.01); *G03G 21/1619* (2013.01); *G03G 21/1652* (2013.01); *G03G 2215/0643* (2013.01); *G03G 2221/169* (2013.01)

(58) Field of Classification Search
CPC ........... G03G 21/1633; G03G 15/0105; G03G 21/1619; G03G 21/1652; G03G 2215/064; G03G 2221/169
See application file for complete search history.

(56) References Cited

U.S. PATENT DOCUMENTS 4,754,293 A * 6/1988 Aizawa .................. G03G 15/30 399/361
5,268,724 A * 12/1993 Koizumi ............ G03G 15/6558 399/388
5,812,920 A * 9/1998 Mizude ............. G03G 15/2028 399/388

(Continued)

FOREIGN PATENT DOCUMENTS

JP 2005165177 A 6/2005
JP 2010122359 A 6/2010

(Continued)

*Primary Examiner* — Allen L Parker
*Assistant Examiner* — Martin Antonio Asmat Uceda
(74) *Attorney, Agent, or Firm* — Canon U.S.A., Inc. IP Division

(57) ABSTRACT

An image forming apparatus includes an apparatus main body having a ground member, a door that pivots around a pivotal support shaft, an electric component provided on the door, and a conductive portion having first and second conductive portions. The first conductive portion is provided on the door and moves with the door. The second conductive portion is provided on the apparatus main body and is electrically connected to the first conductive portion and the ground member. The first conductive portion includes a wire spring having a contact portion that contacts the second conductive portion, and exerts an elastic force to press the second conductive portion. The contact portion is at a position overlapping the door pivotal support shaft when viewed in a direction of a pivot axis line of the door. The contact portion of the wire spring linearly extends over the pivot axis line of the door.

14 Claims, 16 Drawing Sheets

(56) References Cited

U.S. PATENT DOCUMENTS

| | | | | |
|---|---|---|---|---|
| 6,560,437 | B2 * | 5/2003 | Kobaru | G03G 15/657 399/315 |
| 6,689,973 | B2 * | 2/2004 | Meagher | E05B 81/76 200/341 |
| 6,725,003 | B2 * | 4/2004 | Shinkai | G03G 15/0194 399/112 |
| 7,158,734 | B2 * | 1/2007 | Kawamata | G03G 21/1633 399/107 |
| 7,720,430 | B2 * | 5/2010 | Hasegawa | G03G 15/657 399/92 |
| 8,005,412 | B2 * | 8/2011 | Sakashita | G03G 15/1675 399/315 |
| 8,269,810 | B2 * | 9/2012 | Saiki | G03G 15/04054 347/238 |
| 8,369,733 | B2 * | 2/2013 | Kawai | G03G 21/1652 399/88 |
| 8,857,956 | B2 * | 10/2014 | Tomoguchi | B41J 2/17526 347/86 |
| 8,874,003 | B2 * | 10/2014 | Harayama | G03G 21/1652 399/167 |
| 9,069,287 | B2 * | 6/2015 | Takahashi | G03G 21/1676 |
| 9,069,326 | B2 * | 6/2015 | Onishi | G03G 21/1652 |
| 9,201,391 | B2 * | 12/2015 | Yoshikawa | G03G 21/169 |
| 9,291,954 | B1 * | 3/2016 | Kouzu | G03G 15/1665 |
| 11,256,206 | B2 * | 2/2022 | Zhang | G03G 21/1878 |
| 11,561,502 | B2 * | 1/2023 | Ooka | G03G 21/1821 |
| 11,892,795 | B2 * | 2/2024 | Yokoi | G06F 3/1279 |
| 12,282,285 | B2 * | 4/2025 | Taniguchi | G03G 15/1665 |
| 2002/0018666 | A1 * | 2/2002 | Noda | G03G 21/1647 399/90 |
| 2007/0242960 | A1 * | 10/2007 | Kobayashi | G03G 15/2064 399/13 |
| 2009/0208251 | A1 * | 8/2009 | Yuge | G03G 15/757 399/167 |
| 2012/0207507 | A1 * | 8/2012 | Okamoto | H01R 39/64 439/13 |
| 2016/0170335 | A1 * | 6/2016 | Tetsuno | G03G 15/6558 399/316 |
| 2019/0146403 | A1 * | 5/2019 | Maeda | G03G 15/6529 399/357 |
| 2021/0200141 | A1 * | 7/2021 | Kawaguchi | G03G 21/1867 |
| 2022/0050416 | A1 * | 2/2022 | Kawanami | G03G 21/1814 |
| 2022/0070307 | A1 * | 3/2022 | Hayashi | H04N 1/00068 |

FOREIGN PATENT DOCUMENTS

| | | | | |
|---|---|---|---|---|
| JP | 2015028534 | A | | 2/2015 |
| JP | 2015055867 | A | | 3/2015 |
| JP | 2021107902 | A | * | 7/2021 |

* cited by examiner

IMAGE FORMING APPARATUS

BACKGROUND

Field

The present disclosure relates to an image forming apparatus that develops a latent image, which is formed on a drum, with a toner and transfers and fixes a toner image to a recording medium to perform recording.

Description of the Related Art

In an image forming apparatus, a door that pivots around a pivotal support shaft and is opened/closed is generally provided. The door is provided so as to allow an operator to access the inside of a machine when, e.g., a jammed sheet is to be removed from the inside of the machine or a consumable item is to be replaced.

In addition, in the image forming apparatus, an electric substrate is provided for a power source switch or the like. In the electric substrate, due to electrostatic discharge, an electric element on the electric substrate may incur damage or malfunction. A configuration of the image forming apparatus is known in which, to protect the electric substrate, a metallic conductive member (equal to a static eliminator) connected to the ground of an apparatus main body is disposed around the electric substrate. In such a configuration, a conductive member functions as a conductor rod to protect the electric substrate.

Japanese Patent Application Publication No. 2015-028534 discloses a configuration in which, to a door closable/openable with respect to an apparatus main body, an electric substrate is attached, and a pivotal support shaft of the door is formed of an L-shaped metal shaft to function as a conductive member. In the configuration described above, the metal shaft is axially supported by a bearing portion of a main body frame to be connected to the ground.

However, in the configuration described above, the metal shaft is axially supported by the bearing portion, and consequently a contact pressure between the metal shaft and the main body frame may vary depending on an attitude of the door. When the contact pressure between the metal shaft and the main body frame varies depending on the attitude of the door, an electric characteristic may become unstable, and the conductive member may not be electrically stably connected.

SUMMARY

Provided is an image forming apparatus in which electric connection of a conductive portion for protecting an electric component provided on a door is stabilized.

According to an aspect of the present disclosure, an image forming apparatus includes an apparatus main body that includes a ground member having the same potential as that of a ground, a door configured to be opened/closed and to pivot around a pivotal support shaft with respect to the apparatus main body, an electric component that is provided on the door, and a conductive portion that is electrically connected to the ground member to electrically protect the electric component, wherein the conductive portion includes a first conductive portion that is provided on the door and that is configured to move integrally with the door as the door pivots, and includes a second conductive portion that is provided on the apparatus main body and is electrically connected to each of the first conductive portion and the ground member, wherein the first conductive portion includes a wire spring having a contact portion that is configured to come into contact with the second conductive portion, and is configured to exert an elastic force so as to press the second conductive portion, wherein the contact portion is at a position overlapping the pivotal support shaft of the door in a case of being viewed in a direction of a pivot axis line of the door, and wherein the contact portion of the wire spring linearly extends over the pivot axis line of the door.

According to the present disclosure, it is possible to provide an image forming apparatus in which electric connection of a conductive portion for protecting an electric component provided on a door is stabilized.

Further features of the present disclosure will become apparent from the following description of exemplary embodiments with reference to the attached drawings.

DESCRIPTION OF THE EMBODIMENTS

Hereinafter, a description will be given, with reference to the drawings, of embodiments (examples) of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

While the following will describe, by way of example, a case where the present disclosure is applied to a laser beam printer, the present disclosure is applicable to various image forming apparatuses. A representative of the image forming apparatus uses a photosensitive member drum as an image bearing member, and applies a photoelectric image forming process thereto to form an electrostatic latent image and form an image on a recording medium. Examples of the image forming apparatus include an electrophotographic copier, an electrophotographic printer (such as an LED printer or a laser beam printer), an electrophotographic facsimile apparatus, and an electrophotographic word processor. In addition, a multifunction machine having a combination of functions thereof, a mono-color or full-color image forming apparatus to be used as an output device, such as a work station, and the like are also included. The recording medium is a medium on which the image is to be formed by the image forming apparatus, and examples thereof include paper, an OHP sheet, and the like.

First Embodiment

Overall Configuration of Image Forming Apparatus

Figure 1:
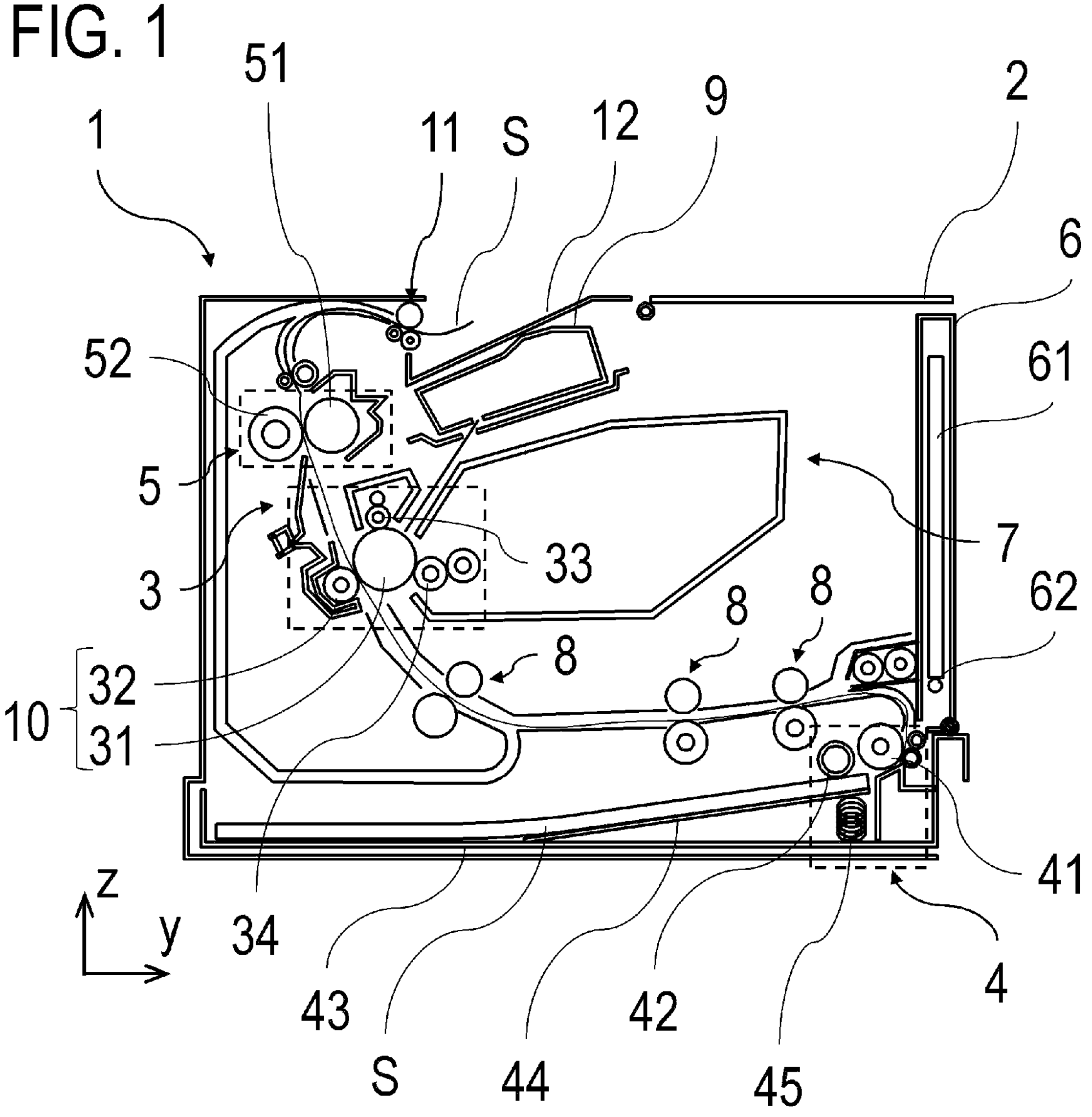
FIG. 1 is a schematic cross-sectional view of an apparatus main body in which a cartridge door is closed according to a first embodiment.
Figure 2:
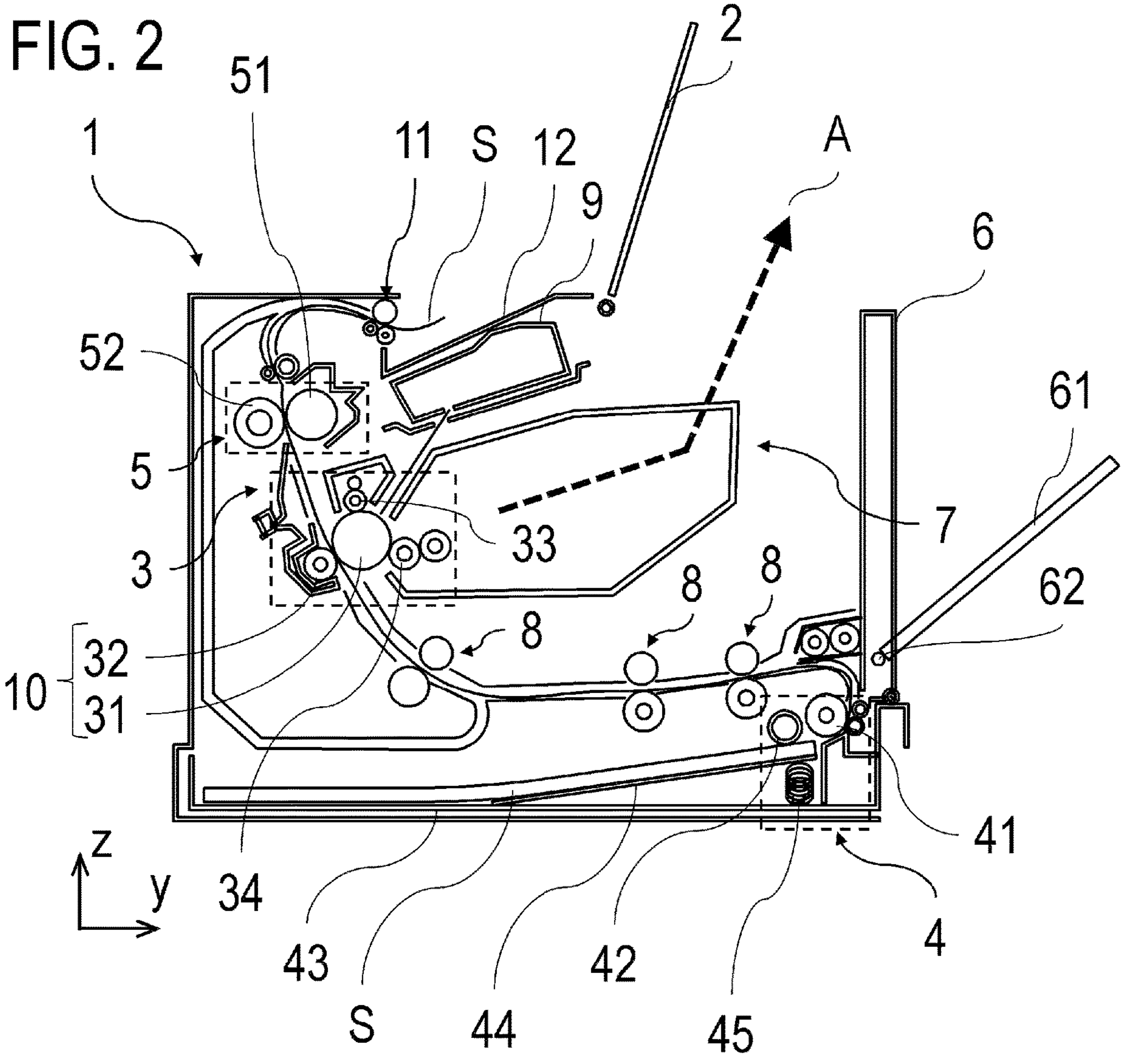
FIG. 2 is a schematic cross-sectional view of the apparatus main body in which the cartridge door is open according to the first embodiment.

A description will be given of, as an example of the image forming apparatus, a first embodiment in which the present disclosure is applied to a laser beam printer. First, referring to FIGS. 1 and 2, a description will be given of an overall configuration of the laser beam printer according to the first embodiment. FIG. 1 is a schematic cross-sectional view of an apparatus main body 1 in a state where a cartridge door 2 and a bypass tray 61 are closed. FIG. 2 is a schematic cross-sectional view of the apparatus main body 1 in a state where the cartridge door 2 and the bypass tray 61 are open. In each of the drawings, a left-right direction of the apparatus main body 1, a front-rear direction of the apparatus main body 1, and a vertical direction are shown as an x-direction, a y-direction, and a z-direction, respectively. In the first embodiment, a width direction of a sheet S to be conveyed in the apparatus main body 1 is parallel to the left-right direction (x-direction) of the apparatus main body 1.

The apparatus main body 1 includes an image forming portion 3 that forms an image on the sheet S according to an electrophotographic system, a sheet feeding device 4 that feeds the stacked sheet S to the image forming portion 3, and a fixing unit 5 that fixes the image formed by the image forming portion 3 to the sheet S. In addition, in a top surface of the apparatus main body 1, the cartridge door 2 that can be opened/closed by pivoting with respect to the apparatus main body 1 is provided. Moreover, in a front surface of the apparatus main body 1, a front door 6 including the bypass tray 61 that can be opened/closed by pivoting with respect to the apparatus main body 1 is provided.

The image forming portion 3 includes a photosensitive member drum 31 on which a toner image is to be formed, a transfer roller 32 that transfers the toner image formed on the photosensitive member drum 31 onto the sheet S, a cleaning roller 33, and a developing roller 34. The photosensitive member drum 31, the cleaning roller 33, and the developing roller 34 are rotatably supported by a cartridge unit 7. The cartridge unit 7 supports a center of rotation of the photosensitive member drum 31. As illustrated in FIG. 2, an operator holds the cartridge unit 7 in a state where the cartridge door 2 is open and moves the cartridge unit 7 in an arrow A direction to be able to pull out the cartridge unit 7 from the apparatus main body 1.

The sheet feeding device 4 includes a separating roller 41, a sheet feeding roller 42, a feeding tray 43, an intermediate plate 44, and an intermediate plate pressing spring 45, and is disposed on a bottom portion of the apparatus main body 1. The feeding tray 43 contains the sheet S stacked in the inside thereof.

The fixing unit 5 includes a heating unit 51 and a pressure roller 52. The fixing unit 5 is one of units detachable from the apparatus main body 1, and is configured to be wholly replaceable.

The front door 6 includes the bypass tray 61 and a tray support shaft 62 extending in the x-direction. The bypass tray 61 is pivotable around the tray support shaft 62 to pivot between a position at which the bypass tray 61 is contained so as to overlap the front door 6 and a position at which the sheet S can be placed thereon.

Image Forming Operation

Next, a description will be given of an operation of forming an image on the sheet S stacked on the feeding tray 43 in the laser beam printer according to the first embodiment. First, on the basis of an image signal from a host computer not shown, a laser beam is emitted from a laser scanner 9 provided in the apparatus main body 1 to irradiate a surface of the photosensitive member drum 31 and form an electrostatic latent image on the surface of the photosensitive member drum 31. At this time, the surface of the photosensitive member drum 31 is cleaned in advance by the cleaning roller 33 and uniformly charged by a charger, and the photosensitive member drum 31 clockwise rotates in FIG. 1. Next, with a toner on the developing roller 34, the electrostatic latent image on the surface of the photosensitive member drum 31 is developed to form a toner image on the photosensitive member drum 31.

Meanwhile, the sheet feeding roller 42 starts to rotate with predetermined timing and, in conjunction therewith, the intermediate plate 44 biased under a force of the intermediate plate pressing spring 45 toward the sheet feeding roller 42 side pivots upward. As a result, a leading end portion of the sheet S stacked on the intermediate plate 44 is brought into pressure contact with the sheet feeding roller 42 under a predetermined force. The sheet feeding roller 42 is controlled herein to rotate counterclockwise in FIG. 1 only during sheet feeding, and feeds the sheet S in pressure contact therewith by using a frictional force. Note that, when a plurality of the sheets S on the intermediate plate 44 are simultaneously fed out, by the action of the separating roller 41, only the uppermost sheet S is separated, and the only one sheet S is conveyed downstream in a conveyance direction.

Then, the sheet S separated by the separating roller 41 is conveyed by a plurality of pairs of conveying rollers 8 to a transfer portion 10 including the photosensitive member drum 31 and the transfer roller 32. In the transfer portion 10, the toner image formed on the photosensitive member drum 31 is electrically attracted by the transfer roller 32 to be transferred onto the sheet S.

Then, the sheet S with the toner image transferred thereon is conveyed to the fixing unit 5 including the heating unit 51 and the pressure roller 52. In the fixing unit 5, the sheet S is heated and pressurized to allow the toner image to be fixed to the sheet S. Finally, the sheet S with the image formed thereon is sequentially discharged by a sheet discharge roller pair 11 onto a sheet receiving tray 12 in an upper portion of the apparatus main body 1.

Configuration of Cartridge Door 2

Figure 3A:
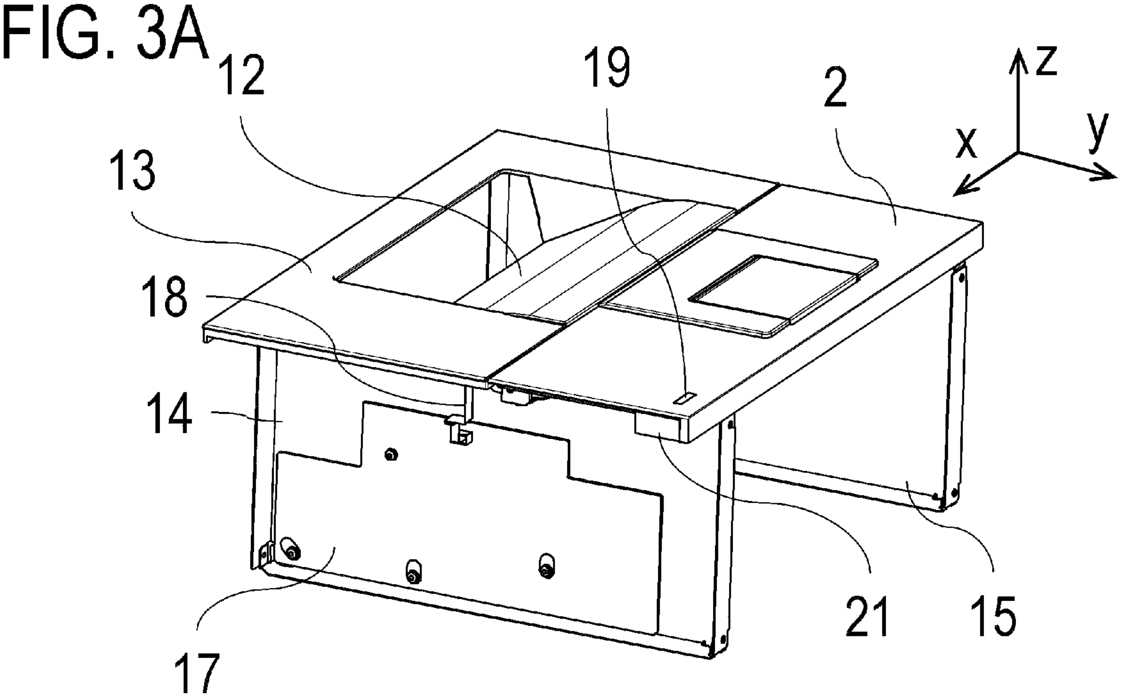
FIGS. 3A and 3B are perspective views each illustrating exterior of a top surface side of the apparatus main body according to the first embodiment.
Figure 3B:
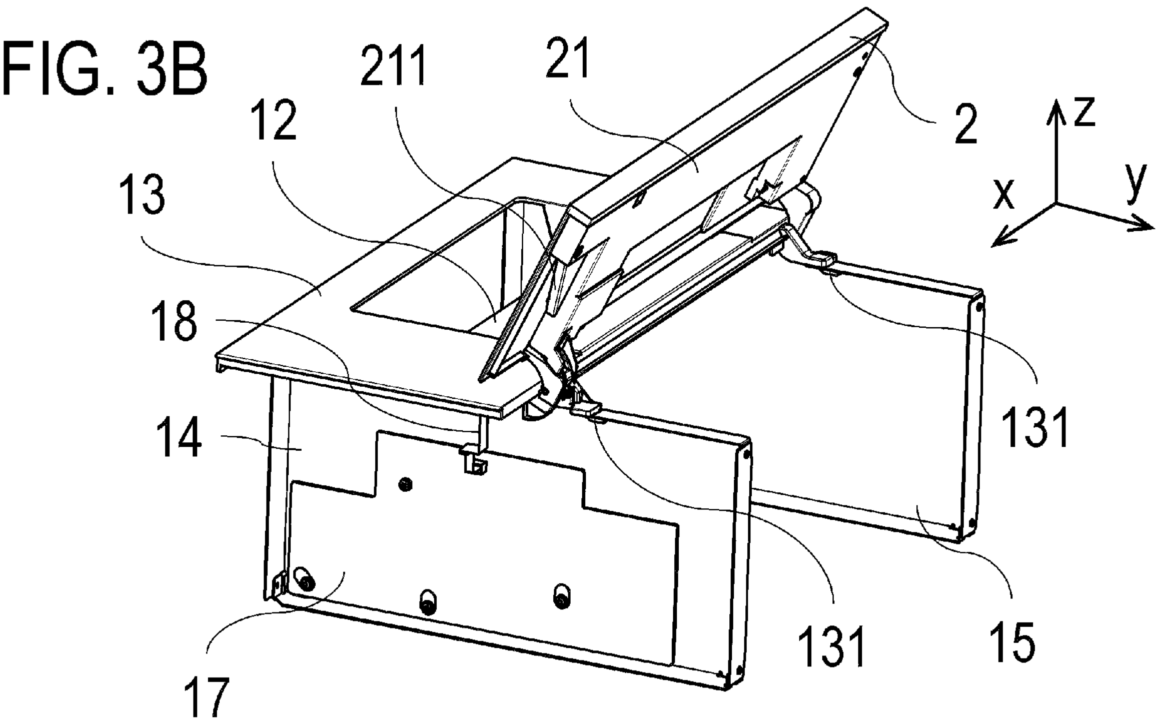

Next, referring to FIGS. 3A and 3B and FIG. 4, a description will be given of a detailed configuration of the cartridge door 2. FIG. 3A is a perspective view illustrating the exterior of the top surface side of the apparatus main body 1 in a state where the cartridge door 2 is closed. FIG. 3B is a perspective view illustrating the exterior of the top surface side of the apparatus main body 1 in a state where the cartridge door 2 is open. The exterior of the top surface side of the apparatus main body 1 is configured to include an upper cover 13 and the cartridge door 2 which are provided adjacent to each other in the y-direction. In addition, the upper cover 13 and the cartridge door 2 are supported from below by a left frame 14 and a right frame 15 which face each other. In a space between the left frame 14 and the right frame 15 and below each of the upper cover 13 and the cartridge door 2, the image forming portion 3 and the fixing unit 5 are disposed.

To a surface of the left frame 14 on the back side of a surface thereof facing the right frame 15, an ECU (Electronic Control Unit) substrate 17 is attached. By the ECU substrate 17, a printing operation of the laser beam printer is electrically controlled.

The upper cover 13 has the sheet receiving tray 12 on which the sheet S discharged by the sheet discharge roller pair 11 is stacked. The upper cover 13 is provided with mounting catches 131. The respective mounting catches 131 are inserted into respective holes provided in the left frame 14 and the right frame 15 to fix the upper cover 13 to each of the left frame 14 and the right frame 15.

The cartridge door 2 is supported to be rotatable with respect to the upper cover 13. When a cartridge, which is a consumable item, is to be replaced or when a jam of the sheet S has occurred, the operator can open the cartridge door 2 and access the inside of the apparatus main body 1. The cartridge door 2 has an in-door cover 21 which is located on an inner side of the apparatus main body 1 when the cartridge door 2 is in the closed state. The in-door cover 21 protects an electric component and the like provided on the cartridge door 2.

The cartridge door 2 is provided with a power source button 19 for switching the laser beam printer between ON/OFF states. The power source button 19 is located on the top surface of the apparatus main body 1 and provided at a position where the operator easily presses the power source button 19 when the cartridge door 2 is in the closed state. In addition, for the ECU substrate 17 to control the ON/OFF state of the laser beam printer according to an operation of the power source button 19, a switch Flexible Flat Cable (FFC) 18 is disposed along each of the cartridge door 2 and the left frame 14. The switch FFC 18 extends along a side wall portion 211 of the in-door cover 21 so as to pass through the inside of the in-door cover 21.

Figure 4:
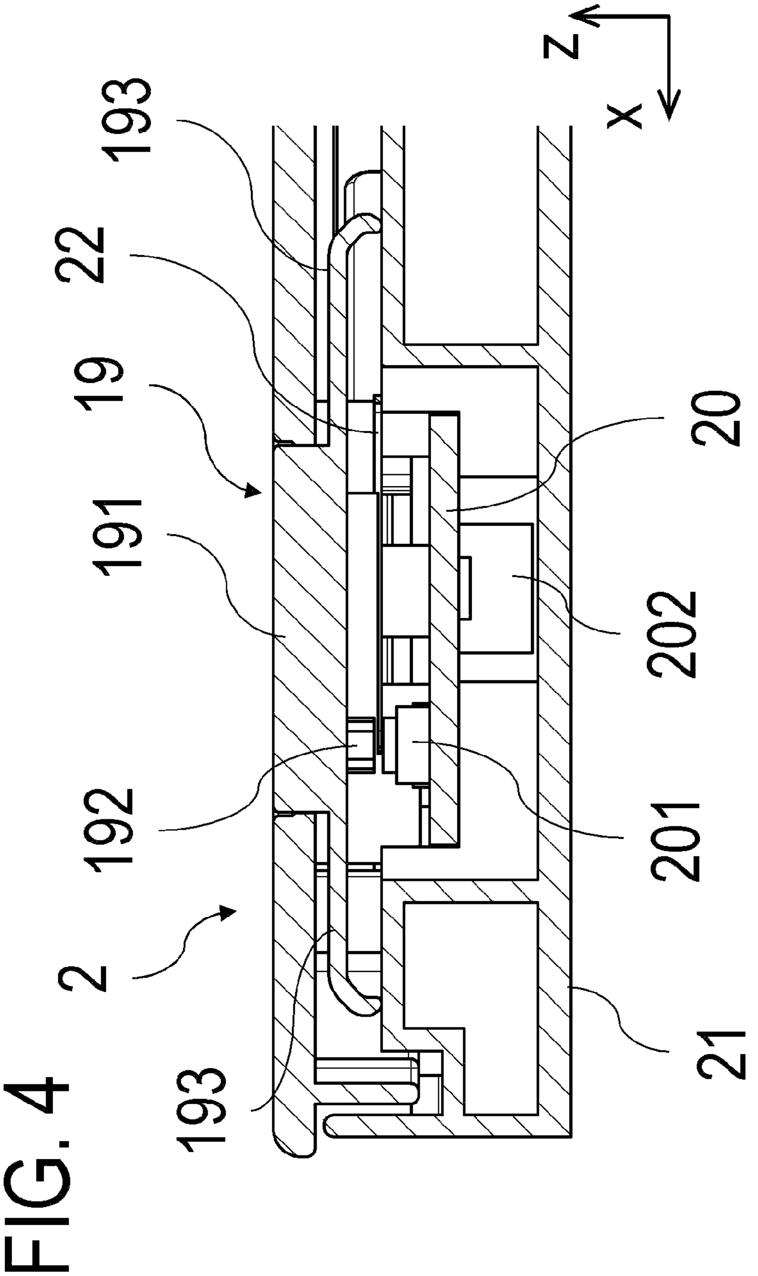
FIG. 4 is a cross-sectional view of a cartridge door and a power source button according to the first embodiment.

FIG. 4 is a cross-sectional view of the cartridge door 2 and the power source button 19 provided on the cartridge door 2. Note that directions in a coordinate system illustrated in the drawings including and subsequent to FIG. 4 indicate directions when the cartridge door 2 is in the closed state. In the following description also, positional relationships between individual members will be mentioned on the assumption that the cartridge door 2 is in the closed state.

The power source button 19 includes a pressed portion 191 to be pressed by the operator, a switch pressing portion 192 provided on a lower surface of the pressed portion 191, and beam-shaped support portions 193 extending from side surfaces of the pressed portion 191. When the cartridge door 2 is in the closed state, the power source button 19 is located above the in-door cover 21, while the pressed portion 191 is exposed on the top surface side of the cartridge door 2. The support portions 193 are the beam-shaped portions extending on both sides from the side surfaces of the pressed portion 191 in a direction perpendicular to a direction in which the power source button 19 is pressed. The support portions 193 have leading end portions bent downward to come into contact with the in-door cover 21.

In the z-direction, between the in-door cover 21 and the power source button 19, a switch substrate 20 with a switch element 201 mounted thereon is provided. When the operator presses the pressed portion 191, the support portions 193 warp, and the switch pressing portion 192 presses the switch element 201 on the switch substrate 20 to switch a power source of the laser beam printer between the ON/OFF states.

Beneath the switch substrate 20, a connector element 202 to be connected to the switch FFC 18 is further mounted. The switch substrate 20 is electrically connected to the ECU substrate 17 via the switch FFC 18 connected to the connector element 202.

Configuration of Conductive Portion

Next, a description will be given of a configuration of a conductive portion that electrically protects the electric component provided on the cartridge door 2. The electric component such as the switch substrate 20 or the switch FFC 18 has a possibility that an element may be damaged by electrostatic discharge or noise occurs in a signal. The electrostatic discharge may be caused by a charged hand, clothes, or the like of the operator. Accordingly, in the first embodiment, the left frame 14 having a ground potential and a switch wire spring 22, which is an electrically connected static eliminating member, are disposed around the switch substrate 20 and the switch FFC 18. When the electrostatic discharge has occurred, the switch wire spring 22 functions as a conductor rod to protect the switch substrate 20 and the switch FFC 18 from the electrostatic discharge.

Figure 5:
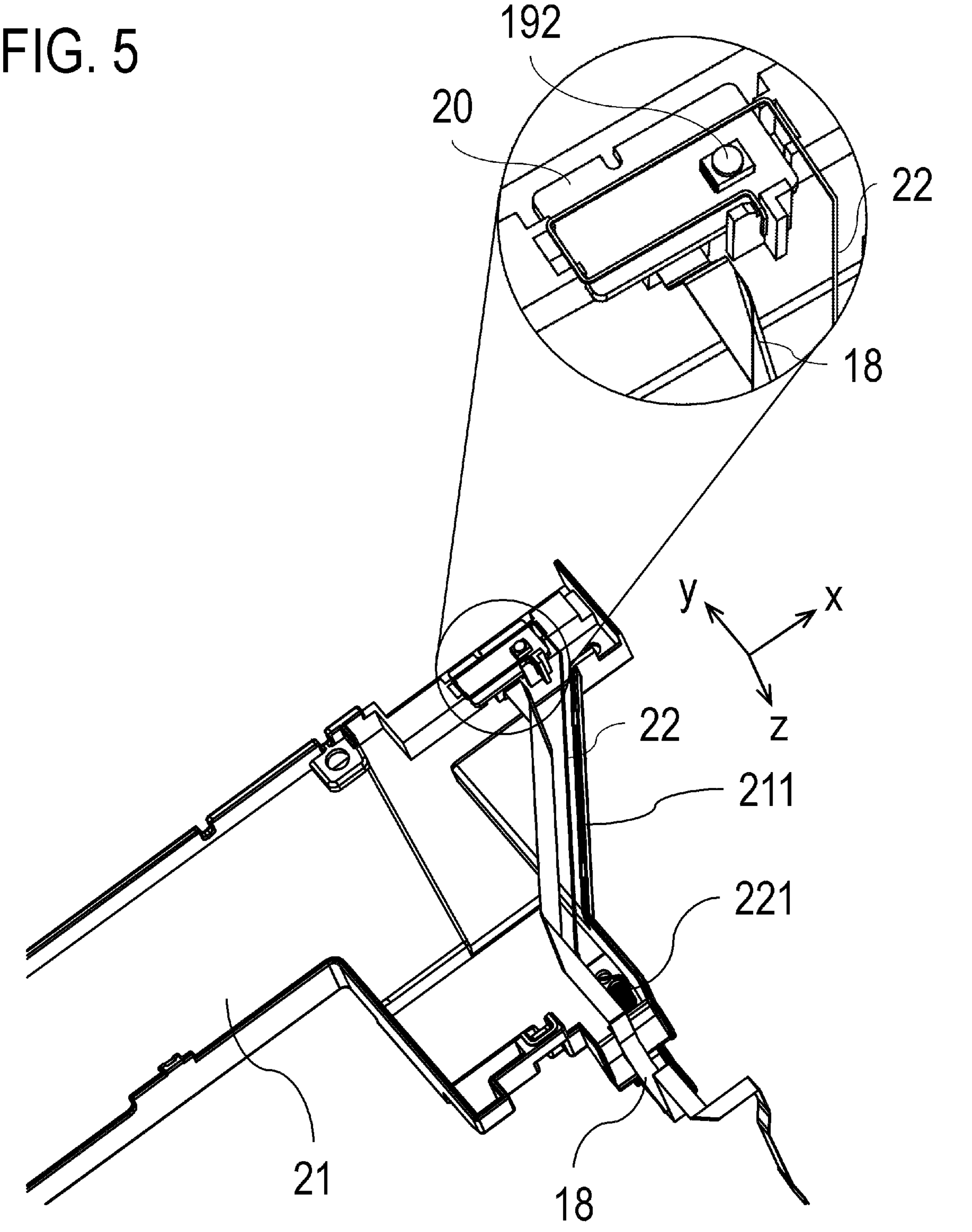
FIG. 5 is a perspective view illustrating components disposed in an in-door cover according to the first embodiment.

FIG. 5 is a perspective view illustrating the components disposed in the in-door cover 21, which illustrates a condition when the in-door cover 21 is viewed from above. In the in-door cover 21, the switch FFC 18, the switch wire spring 22, and the switch substrate 20 are disposed. One end of the switch wire spring 22 is L-shaped and held in a slit of the in-door cover 21, as illustrated in FIG. 5, and extends so as to surround the electric elements on the switch substrate 20. In the in-door cover 21, the switch wire spring 22 extends between the side wall portion 211 of the in-door cover 21 and the switch FFC 18 to be substantially parallel to the switch FFC 18. In other words, in a horizontal direction (x-y plane) perpendicular to a vertical direction (z-direction), the switch wire spring 22 is disposed between each of the switch substrate 20 and the switch FFC 18 and a portion to be touched by the operator. By providing such an arrangement relationship, it is possible to more reliably protect the switch substrate 20 and the switch FFC 18 from the electrostatic discharge.

The switch wire spring 22 is electrically connected to the left frame 14 having the ground potential via another metallic conductive member described later. In addition, the switch wire spring 22 moves integrally with the cartridge door 2 as the cartridge door 2 is opened/closed. Accordingly, to reliably protect each of the switch substrate 20 and the switch FFC 18 from the electrostatic discharge, it is necessary that the switch wire spring 22 is stably electrically connected to the left frame 14 irrespective of an attitude of the cartridge door 2.

Figure 6:
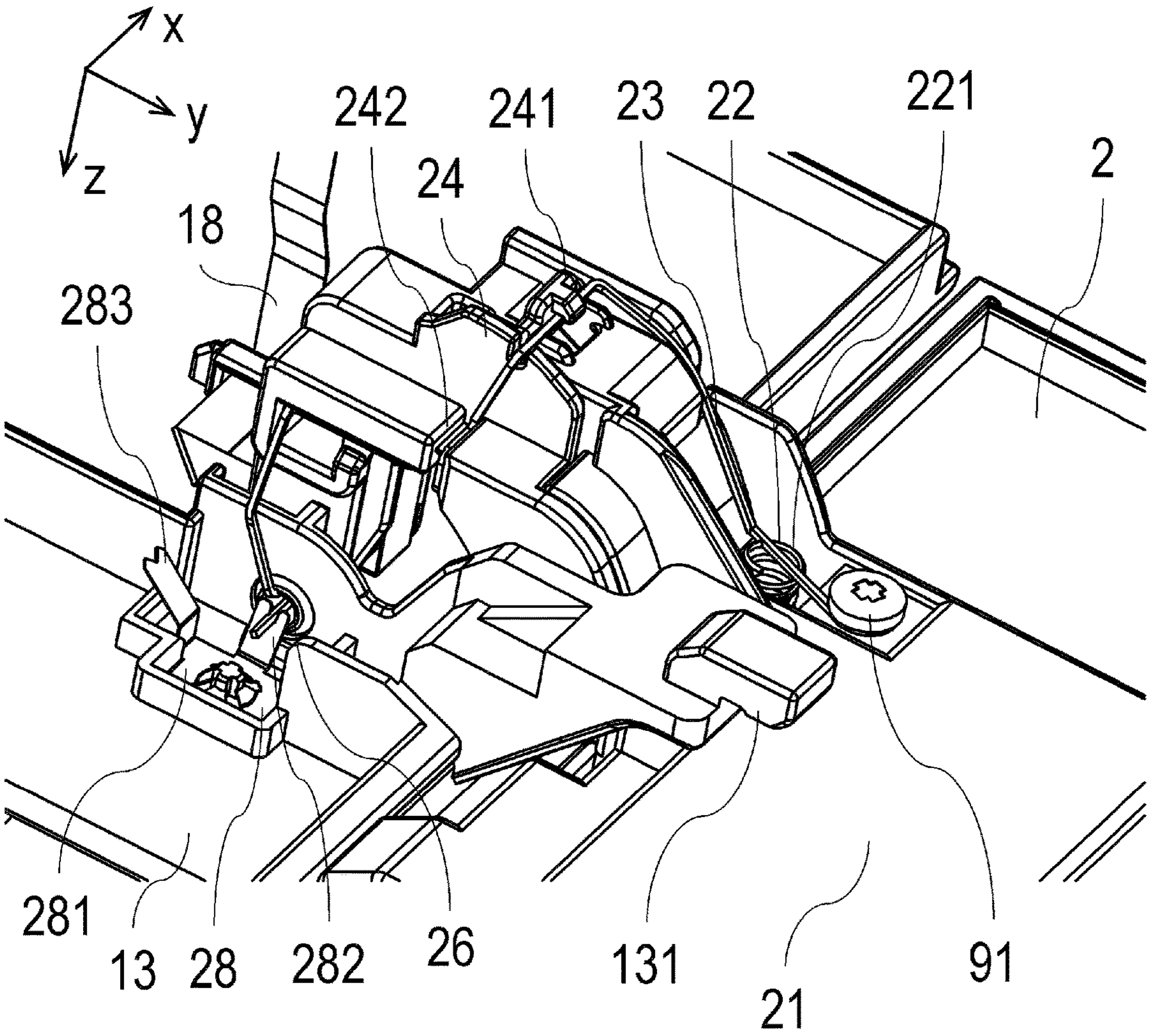
FIG. 6 is a perspective view illustrating a hinge portion of the cartridge door according to the first embodiment.

Next, a description will be given of a plurality of conductive members electrically connecting the switch wire spring 22 and the left frame 14. FIG. 6 is a perspective view illustrating a hinge portion 24 of the cartridge door 2, and illustrates a condition when the hinge portion 24 is viewed from below. The hinge portion 24 included in the cartridge door 2 forms a connecting portion between the cartridge door 2 and the upper cover 13.

The switch wire spring 22 is electrically connected to the left frame 14 via each of a conductive relay wire spring 23 and a ground plate spring 28. A connecting portion between the switch wire spring 22 and the relay wire spring 23 and a connecting portion between the relay wire spring 23 and the ground plate spring 28 are located in the vicinity of the hinge portion 24. Each of the switch wire spring 22, the relay wire spring 23, and the ground plate spring 28 is a metallic elastic member having a flexibility.

The conductive portion that electrically protects the electric component such as the switch substrate 20 or the switch FFC 18 includes, as described above, the switch wire spring 22 as a first wire spring, the relay wire spring 23 as a second wire spring, and the ground plate spring 28. The switch wire spring 22 and the relay wire spring 23 are provided on the cartridge door 2 to move integrally with the cartridge door 2 as the cartridge door 2 pivots, while the ground plate spring 28 is provided on the upper cover 13. In other words, the conductive portion in the first embodiment includes a first conductive portion which includes the switch wire spring 22 and the relay wire spring 23 and moves as the cartridge door 2 pivots and a second conductive portion which includes the ground plate spring 28 and is electrically connected to each of the first conductive portion and the left frame 14. With such a configuration, the switch wire spring 22 is electrically connected to the left frame 14 having the ground potential to protect each of the switch substrate 20 and the switch FFC 18 from the electrostatic discharge.

An end portion of the switch wire spring 22 which is opposite to the switch substrate 20 side is a coil portion 221 formed in a coil shape. The coil portion 221 is a contact portion which has springiness, is provided to be extendable/contractable in a direction perpendicular to a surface of the cartridge door 2 provided with the in-door cover 21, and comes into contact with the relay wire spring 23. In addition, the coil portion 221 is located at an end portion of the cartridge door 2 located on the upper cover 13 side in the y-direction and exposed from the in-door cover 21. Then, the coil portion 221 comes into contact with the relay wire spring 23, while being in a state contracted from a natural length, and an elastic force (resilient force) of the coil portion 221 acts in a direction in which the relay wire spring 23 is pressed. When the cartridge door 2 is in the closed state, the coil portion 221 presses the relay wire spring 23 downward in the vertical direction (z-direction).

The relay wire spring 23 is a member electrically connected to each of the switch wire spring 22 and the ground plate spring 28, and is disposed such that one end portion thereof comes into contact with the switch wire spring 22 and another end portion comes into contact with the ground plate spring 28. The end portion of the relay wire spring 23 located on the switch wire spring 22 side has a leading end fixed by a screw 91 to the cartridge door 2. The relay wire spring 23 is further positioned by each of a hook portion 241 and a slit portion 242 which are provided on and in the hinge portion 24 of the cartridge door 2 with respect to the cartridge door 2. Meanwhile, the end portion of the relay wire spring 23 located on the ground plate spring 28 side is positioned by a containing portion 26 with respect to the cartridge door 2. With such a configuration, similarly to the switch wire spring 22, the relay wire spring 23 also moves integrally with the cartridge door 2 as the cartridge door 2 is opened/closed.

The hook portion 241 comes into contact with the relay wire spring 23 from below. Then, the relay wire spring 23 comes into contact with the switch wire spring 22 at a position between the screw 91 and the hook portion 241. In other words, the relay wire spring 23 is restricted by each of the screw 91 and the hook portion 241 from moving downward, while being pressed downward by the coil portion 221 of the switch wire spring 22. By providing such a configuration, due to an elastic force of the coil portion 221, a contact pressure between the relay wire spring 23 and the switch wire spring 22 is held at a predetermined value or more without involving large movement of the relay wire spring 23. As a result, irrespective of the attitude of the cartridge door 2, the relay wire spring 23 and the switch wire spring 22 are electrically statically connected. Note that the predetermined value for the contact pressure needs only to be a value at which the electrical connection between the relay wire spring 23 and the switch wire spring 22 is stabilized, which is a value varying depending on a material of the relay wire spring 23 and the switch wire spring 22 or the like.

In the hinge portion 24 of the cartridge door 2, the slit portion 242 that restricts the relay wire spring 23 from moving in the y-direction is formed. In the first embodiment, the slit portion 242 is formed to extend between two surfaces which are a surface of the hinge portion 24 facing the x-direction and a surface of the hinge portion 24 facing the z-direction, and the relay wire spring 23 is contained inside the slit portion 242.

Figure 7:
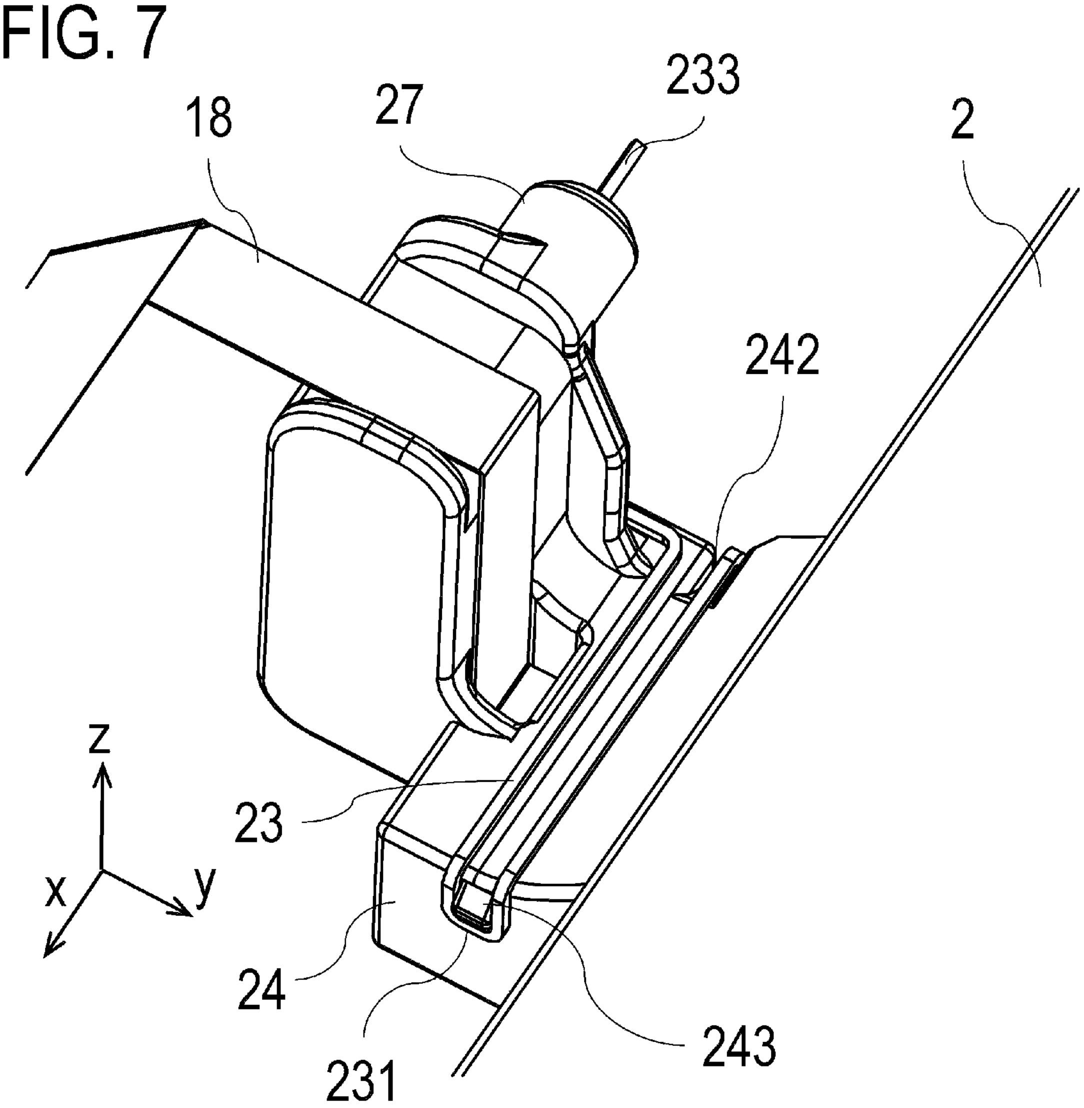
FIG. 7 is a perspective view illustrating a position at which a relay wire spring according to the first embodiment is disposed.

FIG. 7 is a perspective view illustrating a position at which the relay wire spring 23 placed on the hinge portion 24 is disposed when the hinge portion 24 is viewed from above. In other words, FIG. 7 is a view obtained by viewing the hinge portion 24 illustrated in FIG. 6 from the opposite side. In the x-direction, at an end portion of the hinge portion 24 which is opposite to that formed with the slit portion 242, a protruded portion 243 is provided to be protruded from a surface of the hinge portion 24 in the x-direction. The relay wire spring 23 is disposed so as to extend from the slit portion 242 to the protruded portions 243, and a bent portion 231 of the relay wire spring 23 is hooked on the protruded portion 243. In other words, the relay wire spring 23 extends from the slit portion 242 to the protruded portion 243 so as to traverse the hinge portion 24 in the x-direction, and the relay wire spring 23 is restricted by the protruded portion 243 from moving to an upper side of the apparatus main body 1. By providing such a configuration, it is possible to restrict upward movement of the relay wire spring 23. Since the movement of the relay wire spring 23 is restricted by each of the slit portion 242 and the protruded portion 243, it is also possible to prevent such a situation in which the relay wire spring 23 is caught by the cartridge door 2 when the cartridge door 2 is opened/closed, and the cartridge door 2 cannot be opened/closed. In addition, since the relay wire spring 23 is disposed at a position closer to a gap between the upper cover 13 and the cartridge door 2 than the switch FFC 18, it is possible to prevent electrostatic discharge from occurring from the gap into the switch FFC 18.

Then, the relay wire spring 23 extending from the slit portion 242 starts to make a U-turn in the bent portion 231 and extends again to the vicinity of the slit portion 242 to be contained up ahead in the containing portion 26 provided in a pivotal support shaft 27 of the cartridge door 2. The relay wire spring 23 is disposed such that the protruded portion 233 corresponding to the end portion of the relay wire spring 23 located on the ground plate spring 28 side is protruded from the containing portion 26. The protruded portion 233 is a contact portion that comes into contact with the ground plate spring 28.

The pivotal support shaft 27 is a portion serving as a center of the pivoting of the cartridge door 2 when the cartridge door 2 is opened/closed, and is axially supported by the upper cover 13. In other words, a pivot axis line of the pivotal support shaft 27 matches a pivot axis line of the cartridge door 2. The pivotal support shaft 27 in the first embodiment is formed of a resin to be integral with the cartridge door 2. In FIG. 7, only one end portion of the cartridge door 2 in the x-direction is illustrated but, at another end portion opposite to the one end portion also, the pivotal support shaft of the cartridge door 2 is similarly formed.

Figure 8:
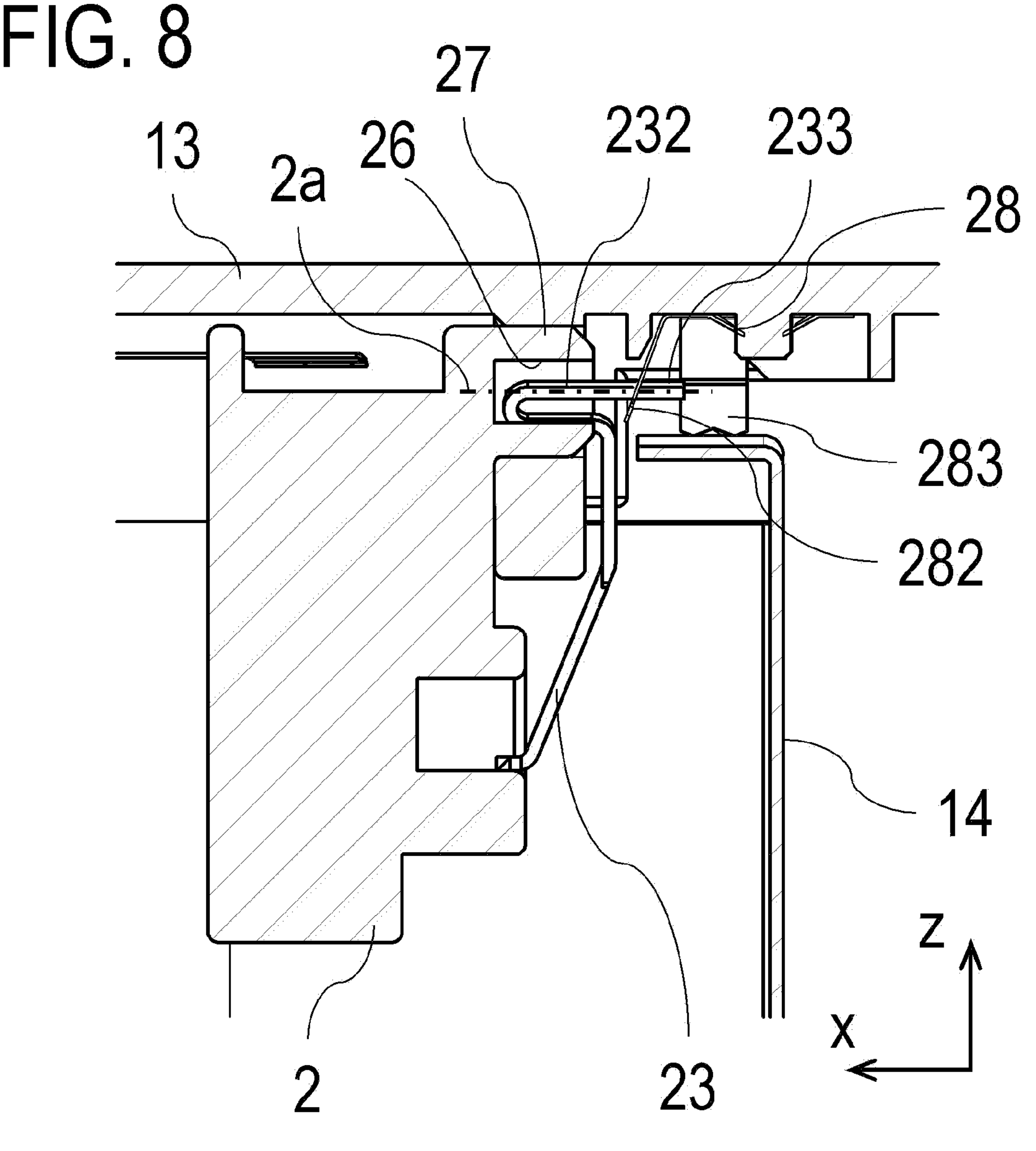
FIG. 8 is a cross-sectional view illustrating a contact portion between a first conductive portion and a second conductive portion according to the first embodiment.
Figure 9:
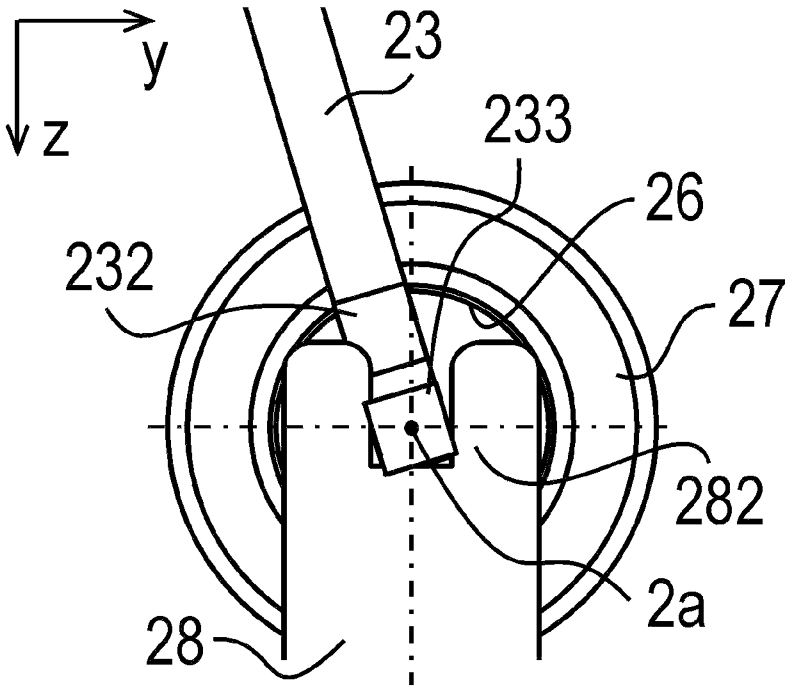
FIG. 9 is a front view illustrating the contact portion between the first conductive portion and the second conductive portion according to the first embodiment.

FIG. 8 is a cross-sectional view illustrating a contact portion between the first conductive portion (the relay wire spring 23) and the second conductive portion (the ground plate spring 28). FIG. 9 is a front view illustrating the contact portion between the first conductive portion (the relay wire spring 23) and the second conductive portion (the ground plate spring 28) when viewed in a direction of the pivot axis line of the cartridge door 2. The containing portion 26 is formed into a cylindrical shape inside the pivotal support shaft 27 to be open in a direction of the pivot axis line of the pivotal support shaft 27. The pivot axis line of the containing portion 26 when the cartridge door 2 is opened/closed matches the pivot axis line of the pivotal support shaft 27. In other words, when the cartridge door 2 is opened/closed, the cartridge door 2, the pivotal support shaft 27, and the containing portion 26 pivot around the same pivot axis line 2*a*.

A contained portion 232 of the relay wire spring 23 located inside the containing portion 26 has a shape bent in a U-shaped shape. The contained portion 232 extends in a direction of the pivot axis line 2*a*, while being in contact with an inner peripheral surface of the containing portion 26, is bent inside the containing portion 26, and extends to the outside of the containing portion 26 so as to extend on the pivot axis line 2*a*. On a leading end side of a portion of the contained portion 232 which extends over the pivot axis line 2*a* of the containing portion 26, the protruded portion 233 of the containing portion 26 which is outwardly protruded is located.

To the upper cover 13, the ground plate spring 28 is fixed. The ground plate spring 28 has a fixed portion 281 fixed to the upper cover 13 of the apparatus main body 1 to come into contact with the upper cover 13 as well as a wire spring contact portion 282 and a frame contact portion 283 which are bent from the fixed portion 281. The wire spring contact portion 282 of the ground plate spring 28 is a contact portion in contact with the protruded portion 233, while the frame contact portion 283 is a contact portion in contact with the left frame 14. In the wire spring contact portion 282, a groove is formed and, in the groove, the relay wire spring 23 is fitted to come into contact with the ground plate spring 28. Since the left frame 14 is configured have the same potential as that of the ground, each of the switch wire spring 22, the relay wire spring 23, and the ground plate spring 28 also has the same potential as that of the ground.

The protruded portion 233 corresponding to the end portion of the relay wire spring 23 located on the ground plate spring 28 side is provided so as to linearly extend on the pivot axis line 2*a* and be fitted into the groove portion of the wire spring contact portion 282 of the ground plate spring 28, and comes into contact with the wire spring contact portion 282. As described above, since the cartridge door 2 pivots around the pivotal support shaft 27, the protruded portion 233 extending over the pivot axis line 2*a* is constantly located over the pivot axis line 2*a* even when the cartridge door 2 is opened/closed. Then, as illustrated in FIG. 9, when viewed in the direction of the pivot axis line 2*a*, the contact portion in which the protruded portion 233 and the wire spring contact portion 282 are in contact with each other is located at a position overlapping the pivotal support shaft 27 in the vicinity of the pivot axis line 2*a*.

The relay wire spring 23 is in contact with the ground plate spring 28, while being wound so as to exert an elastic force in a direction in which the protruded portion 233 presses the wire spring contact portion 282. Likewise, the ground plate spring 28 is in contact with the relay wire spring 23, while being wound so as to exert an elastic force in a direction in which the wire spring contact portion 282 presses the protruded portion 233. By providing such a configuration, by the elastic forces of the relay wire spring 23 and the ground plate spring 28, a contact pressure between the relay wire spring 23 and the ground plate spring 28 is held at a predetermined value or more. Consequently, irrespective of the attitude of the cartridge door 2, the relay wire spring 23 in the first conductive portion provided on the cartridge door 2 and the ground plate spring 28 in the second conductive portion provided on the apparatus main body 1 are electrically stably connected.

Function/Effect of First Embodiment

In the first embodiment, in the cartridge door 2 which is opened/closed with respect to the apparatus main body 1 including the left frame 14 serving as a ground member, the switch substrate 20 is disposed. In the vicinity of the switch substrate 20, the switch wire spring 22 electrically connected to the left frame 14 via each of the relay wire spring 23 and the ground plate spring 28 and having the ground potential is disposed. As described above, when the cartridge door 2 is opened/closed, the first conductive portion (the switch wire spring 22 and the relay wire spring 23) moves integrally with the cartridge door 2, while the second conductive portion (the ground plate spring 28) does not move with respect to the apparatus main body 1, similarly to the left frame 14. However, the protruded portion 233 of the relay wire spring 23 which comes into contact with the ground plate spring 28 is disposed so as to extend on the pivot axis line of the cartridge door 2, and the protruded portion 233 is at a position overlapping the pivotal support shaft 27 when viewed in the direction of the pivot axis line of the cartridge door 2. Consequently, even when the attitude of the cartridge door 2 changes, a relative position of the protruded portion 233 with respect to the ground plate spring 28 does not substantially change. By providing such a configuration, even when the cartridge door 2 is opened/closed, a state of contact between the protruded portion 233 and the wire spring contact portion 282 is stabilized to provide electrically stable connection therebetween.

Additionally, in the first embodiment, as members included in the conductive portion, elastic members are adopted and, due to the elastic forces, the individual members are configured to come into contact with each other under a contact pressure equal to or more than a predetermined value. Specifically, in the contact portion between the switch wire spring 22 and the relay wire spring 23, the elastic force of the coil portion 221 at the one end portion of the switch wire spring 22 causes the contact pressure equal to or more than the predetermined value. Meanwhile, in the contact portion between the relay wire spring 23 and the ground plate spring 28, the elastic force of the relay wire spring 23 and the elastic force of the ground plate spring 28 cause the contact pressure equal to or more than the predetermined value. By providing such a configuration, even when a position of the contact portion is displaced due to component tolerance, backlash, or an impact from the outside, the contact pressure equal to or more than the predetermined value is produced, and therefore the individual members are electrically stably connected. In addition, since a contact resistance between the individual members is reduced, a current conductivity is ensured.

Moreover, even when the protruded portion 233 receives a force more than expected from the wire spring contact portion 282 and the relay wire spring 23 is excessively warped, the containing portion 26 restricts movement of the contained portion 232 of the relay wire spring 23. Therefore, with the configuration in the first embodiment, a contact pressure between the protruded portion 233 and the wire spring contact portion 282 is unlikely to decrease, and electrically stable connection is provided therebetween. Note that, in applying the present disclosure, when the first conductive portion and the second conductive portion are brought into contact with each other, not both of the member included in the first conductive portion and the member included in the second conductive portion necessarily need to be the elastic members. For example, when the elastic force of the relay wire spring 23 is sufficiently large to obtain the contact pressure equal to or more than the predetermined value, the contact member in the second conductive portion which comes into contact with the relay wire spring 23 need not necessarily be a member that exerts the elastic force in the direction in which the relay wire spring 23 is pressed.

Note that, as a means that electrically connects any two portions, a configuration using bundled wires is also typical. However, when a fixed member and an opening/closing member are to be connected by using the bundled wires, due to bending and twisting of the bundled wires, a durability of the bundled wires may deteriorate, and the bundled wires may be broken. Meanwhile, in the configuration in the first embodiment, the wire springs which are more excellent in strength than the bundled wires are used, and accordingly stable electrical connection is maintained over a longer period of time.

Second Embodiment

Next, a description will be given of a second embodiment of the present disclosure. In the second embodiment, the position at which the relay wire spring 23 is disposed is different from that in the first embodiment. In the following description of the second embodiment, a description of the same configurations as those in the first embodiment is omitted by assigning the same reference signs thereto, and a description will be given only of characteristic configurations of the second embodiment.

Figure 10:
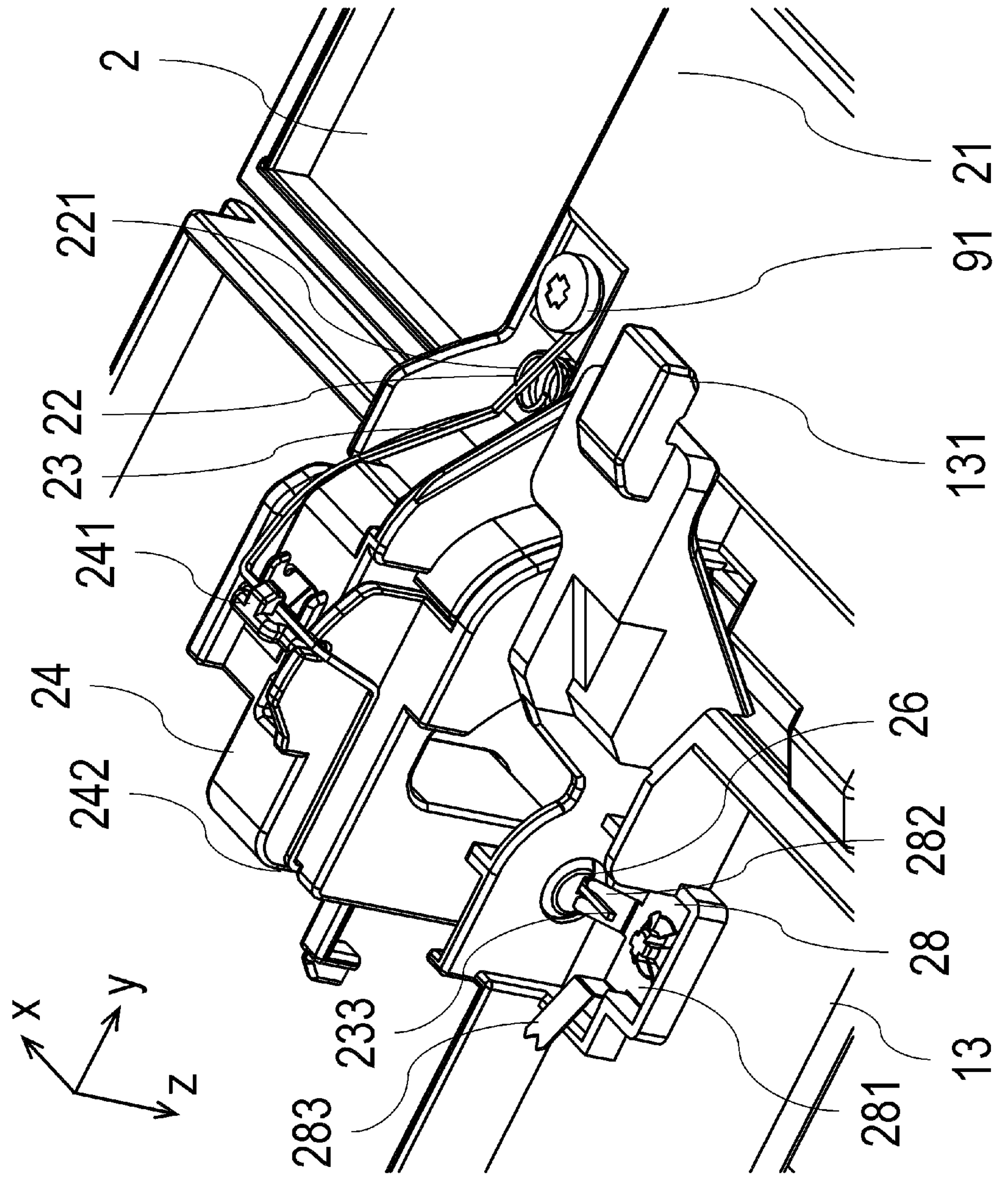
FIG. 10 is a perspective view illustrating the hinge portion of the cartridge door according to a second embodiment.

FIG. 10 is a perspective view illustrating the hinge portion 24 of the cartridge door 2 according to the second embodiment. In the second embodiment also, a conductive portion for electrically protecting the switch substrate 20 and the like includes the switch wire spring 22, the relay wire spring 23, and the ground plate spring 28. The conductive portion includes a first conductive portion which includes the switch wire spring 22 and the relay wire spring 23 and moves integrally with the cartridge door 2 and a second conductive portion which includes the ground plate spring 28 and electrically connects the first conductive portion to the left frame 14.

As illustrated in FIG. 10, in the second embodiment also, the relay wire spring 23 is provided on the cartridge door 2 and has one end portion connected to the switch wire spring 22 and another end portion connected to the ground plate spring 28. The relay wire spring 23 is positioned with respect to the cartridge door 2 by the screw 91, the hook portion 241, the slit portion 242, and the containing portion 26. However, in the second embodiment, the position at which the slit portion 242 is disposed, a shape of the containing portion 26, and the like are different from those in the first embodiment. The slit portion 242 according to the second embodiment is formed on a surface of the hinge portion 24 facing the y-direction, and the relay wire spring 23 is restricted by the slit portion 242 from moving in the x-direction.

Figure 11:
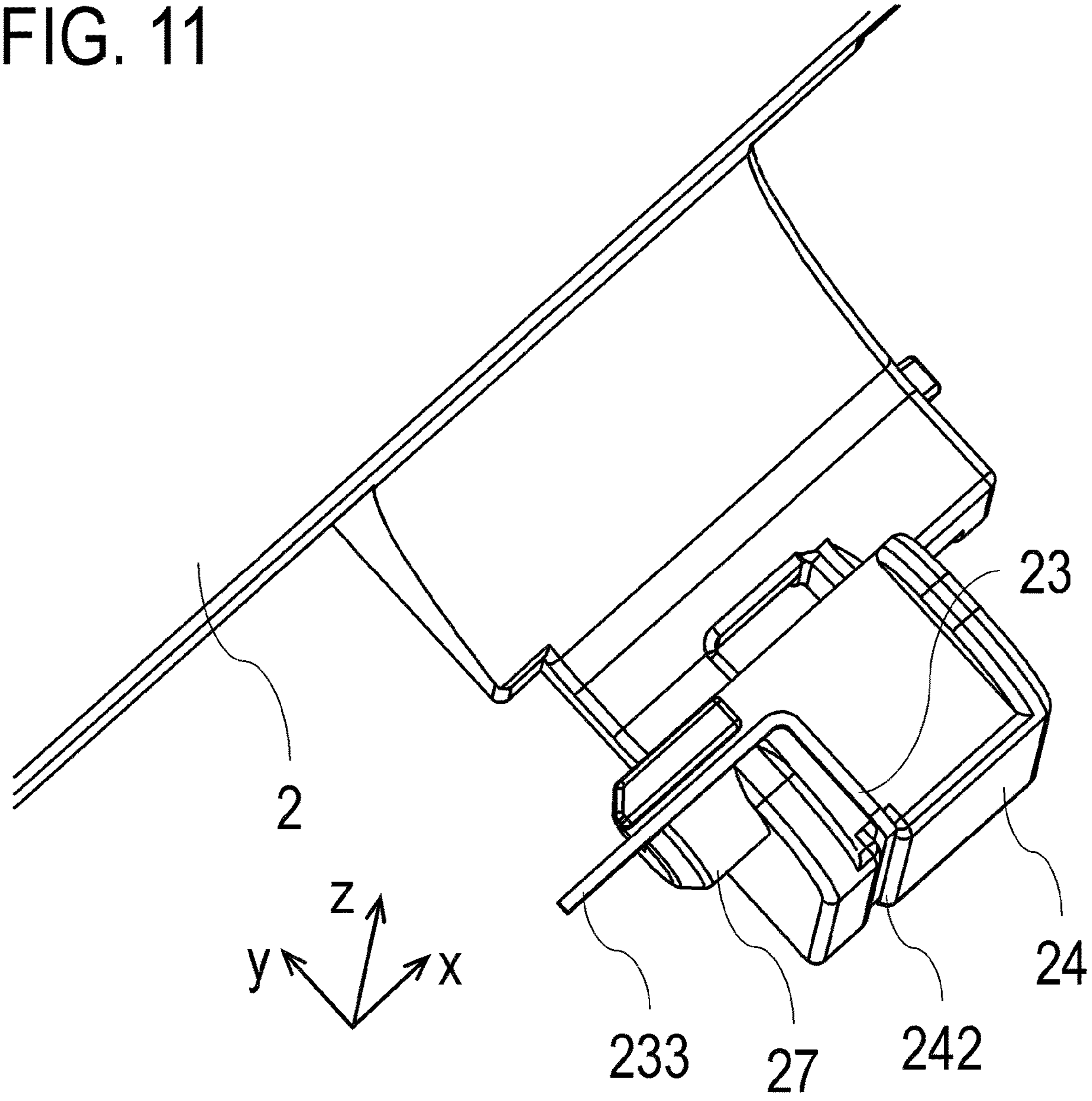
FIG. 11 is a perspective view illustrating a position at which the relay wire spring according to the second embodiment is disposed.
Figure 12:
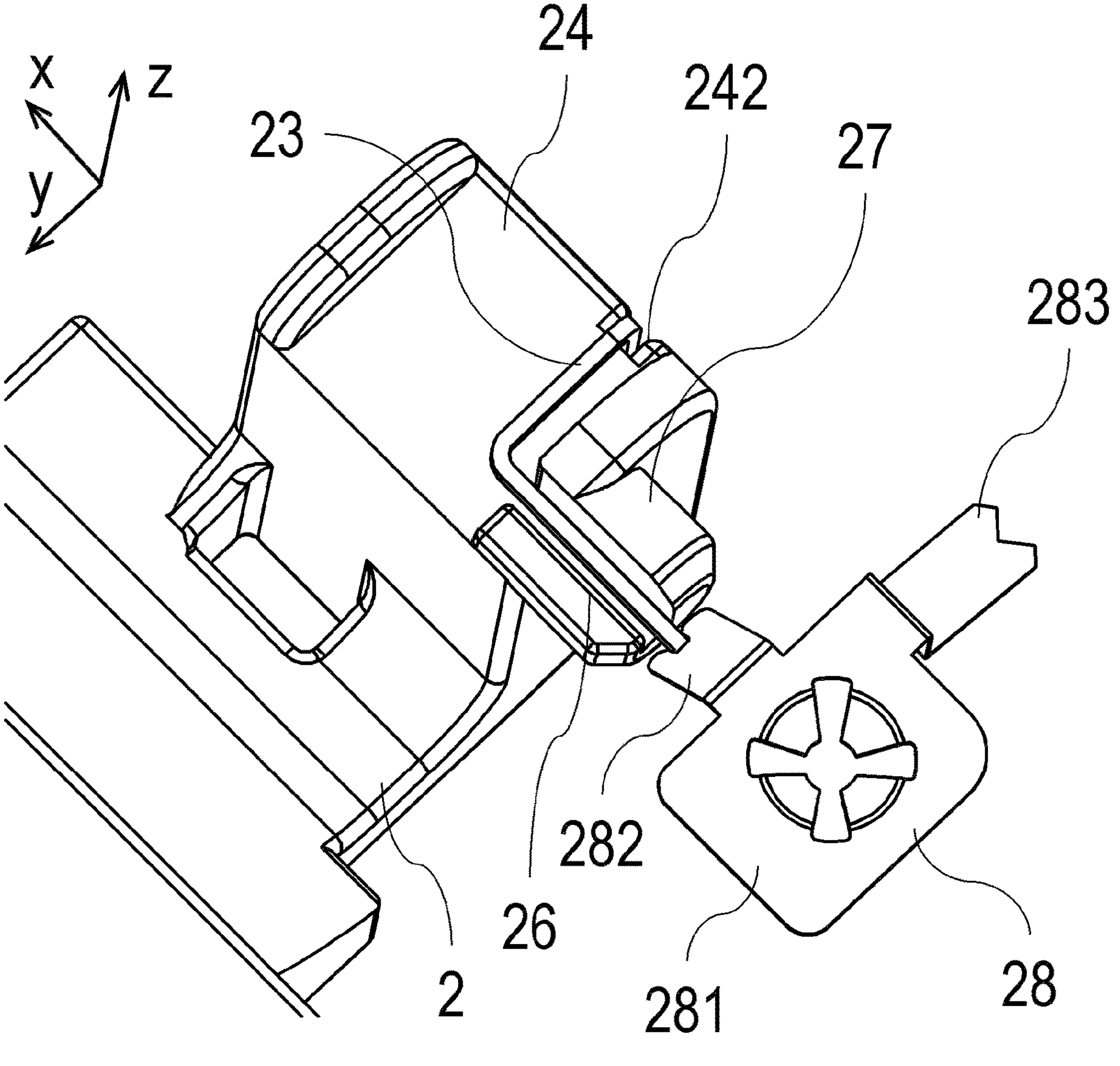
FIG. 12 is a perspective view illustrating the contact portion between the first conductive portion and the second conductive portion according to the second embodiment.
Figure 13:
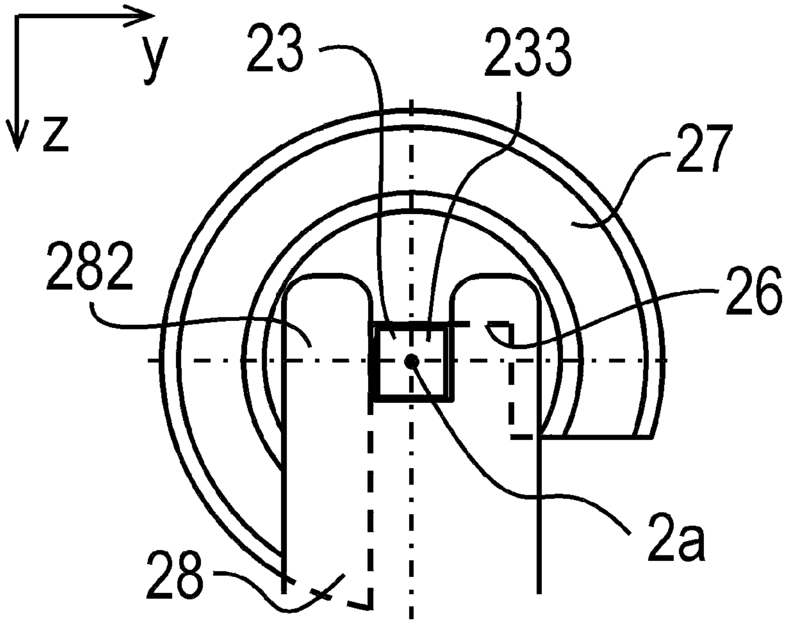
FIG. 13 is a front view illustrating the contact portion between the first conductive portion and the second conductive portion according to the second embodiment.

FIG. 11 is a perspective view illustrating a position at which the relay wire spring 23 placed on the hinge portion 24 according to the second embodiment is disposed. FIG. 12 is a perspective view illustrating a contact portion between the first conductive portion (the relay wire spring 23) and the second conductive portion (the ground plate spring 28) according to the second embodiment. FIG. 13 is a front view illustrating the contact portion between the first conductive portion (the relay wire spring 23) and the second conductive portion (the ground plate spring 28) according to the second embodiment when viewed in the direction of the pivot axis line 2*a* of the cartridge door 2. The relay wire spring 23 is disposed so as to extend from one end thereof fixed by the screw 91 to the protruded portion 233 protruded from the base of the pivotal support shaft 27 toward a leading end thereof via each of the hook portion 241 and the slit portion 242.

In the second embodiment, the relay wire spring 23 is not disposed so as to traverse the hinge portion 24 in the x-direction and is not formed with the bent portion 231, and accordingly the relay wire spring 23 is configured to have an entire length shorter than that in the first embodiment. Therefore, the configuration in the second embodiment leads to reduced production cost and space saving compared to that in the first embodiment.

The pivotal support shaft 27 is formed with the containing portion 26 that contains the relay wire spring 23. The containing portion 26 in the second embodiment is a notch extending through the pivotal support shaft 27 in the direction of the pivot axis line 2*a* of the cartridge door 2. In FIG. 13, the containing portion 26 hidden by the ground plate spring 28 is indicated by a hidden line (dotted line). The containing portion 26 is formed to extend from an outer peripheral surface of the pivotal support shaft 27 beyond a center of pivoting, and supports the relay wire spring 23 such that the protruded portion 233 of the relay wire spring 23 extends over the pivot axis line 2*a*. In the second embodiment also, the contact portion in which the protruded portion 233 and the wire spring contact portion 282 are in contact with each other when viewed in the direction of the pivot axis line 2*a* is at a position overlapping the pivotal support shaft 27 in the vicinity of the pivot axis line 2*a*. In other words, in the second embodiment also, positions of the protruded portion 233 and the wire spring contact portion 282 relative to each other do not substantially change when the cartridge door 2 is opened/closed, and therefore a state of contact between the protruded portion 233 and the wire spring contact portion 282 is stabilized to provide electrically stable connection therebetween.

In the second embodiment also, the ground plate spring 28 is in contact with the relay wire spring 23, while being wound so as to exert an elastic force in a direction in which the wire spring contact portion 282 presses the protruded portion 233. Meanwhile, the relay wire spring 23 may also be in contact with the ground plate spring 28, while being wound so as to exert an elastic force in a direction in which the protruded portion 233 presses the wire spring contact portion 282. By providing such a configuration, by the elastic forces of the relay wire spring 23 and the ground plate spring 28, a contact pressure between the relay wire spring 23 and the ground plate spring 28 is held at a predetermined value or more. Therefore, irrespective of an attitude of the cartridge door 2, the relay wire spring 23 in the first conductive portion which moves integrally with the cartridge door 2 and the ground plate spring 28 in the second conductive portion which is held in the apparatus main body 1 are electrically stably connected.

In addition, the containing portion 26 is configured so as to restrict movement of the relay wire spring 23 in a direction away from the ground plate spring 28 irrespective of the attitude of the cartridge door 2. Consequently, even when the protruded portion 233 of the relay wire spring 23 is pressed by the wire spring contact portion 282 of the ground plate spring 28 under the elastic force of the ground plate spring 28, it is possible to obtain the contact pressure equal to or more than the predetermined value irrespective of the attitude of the cartridge door 2.

With the configuration in the second embodiment, due to the elastic force, the connecting portion between the individual members included in the conductive portion is configured such that the individual members are in contact with each other under the contact pressure equal to or more than the predetermined value, and consequently electric connection is stabilized. Specifically, in the contact portion between the switch wire spring 22 and the relay wire spring 23, the elastic force of the coil portion 221 causes the contact pressure equal to or more than the predetermined value. Meanwhile, in the contact portion between the relay wire spring 23 and the ground plate spring 28, the elastic force of the relay wire spring 23 and the elastic force of the ground plate spring 28 cause the contact pressure equal to or more than the predetermined value. Consequently, the conductive portion is electrically stably connected. In addition, in the configuration in the second embodiment, the relay wire spring 23 need not be bent inside the containing portion 26, and therefore a length of the relay wire spring 23 is reduced compared to that in the first embodiment, which leads to reduced production cost and space saving.

Third Embodiment

Next, a description will be given of a third embodiment of the present disclosure. The third embodiment is different from the first embodiment in that a first conductive portion which moves integrally with the cartridge door 2 includes a conductive support shaft 29 serving as a pivotal support shaft of the cartridge door 2. In the following description of the third embodiment, a description of the same configurations as those in the first embodiment is omitted by assigning the same reference signs thereto, and a description will be given only of characteristic configurations of the third embodiment.

Figure 14:
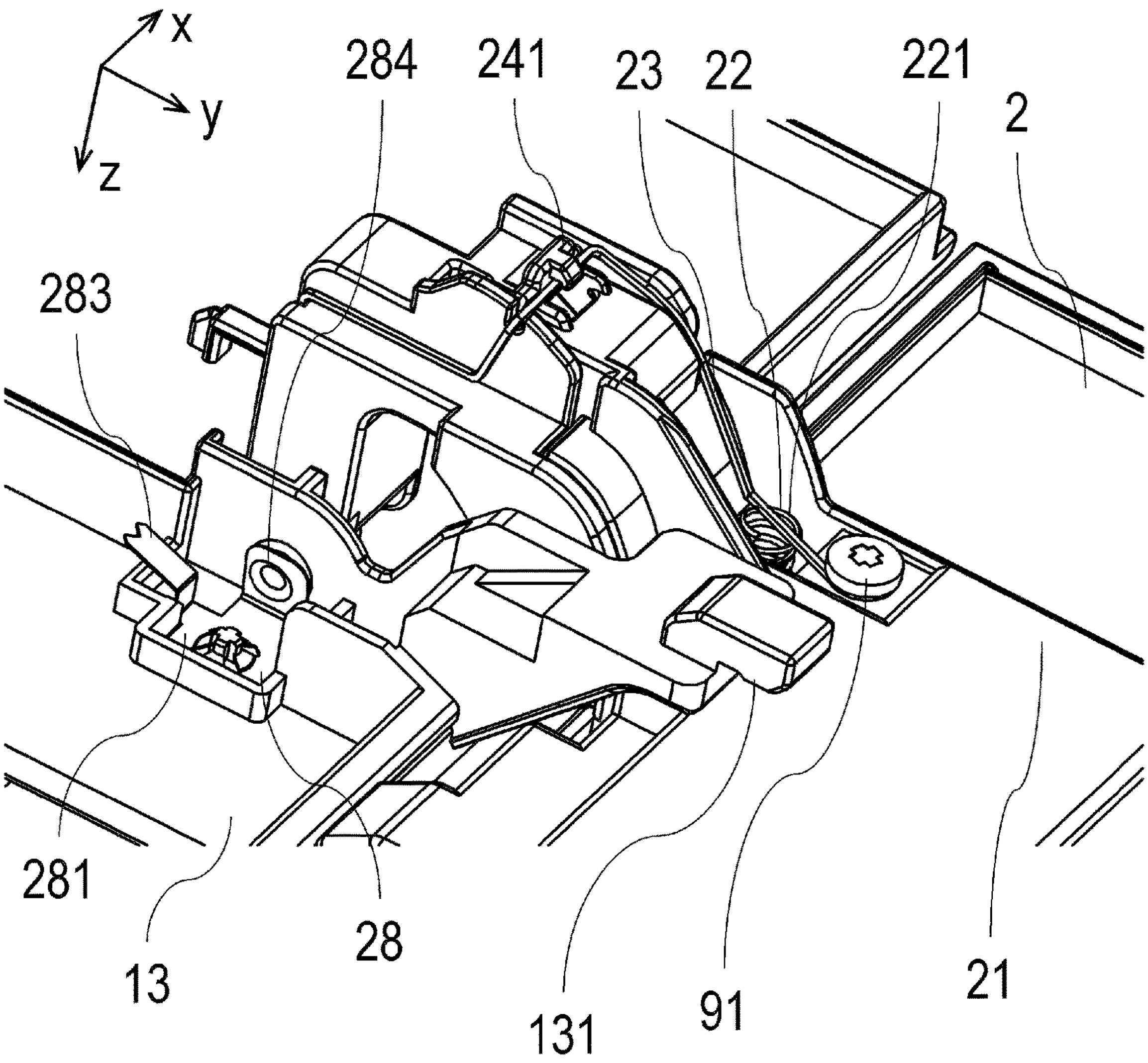
FIG. 14 is a perspective view illustrating the hinge portion of the cartridge door according to a third embodiment.
Figure 15:
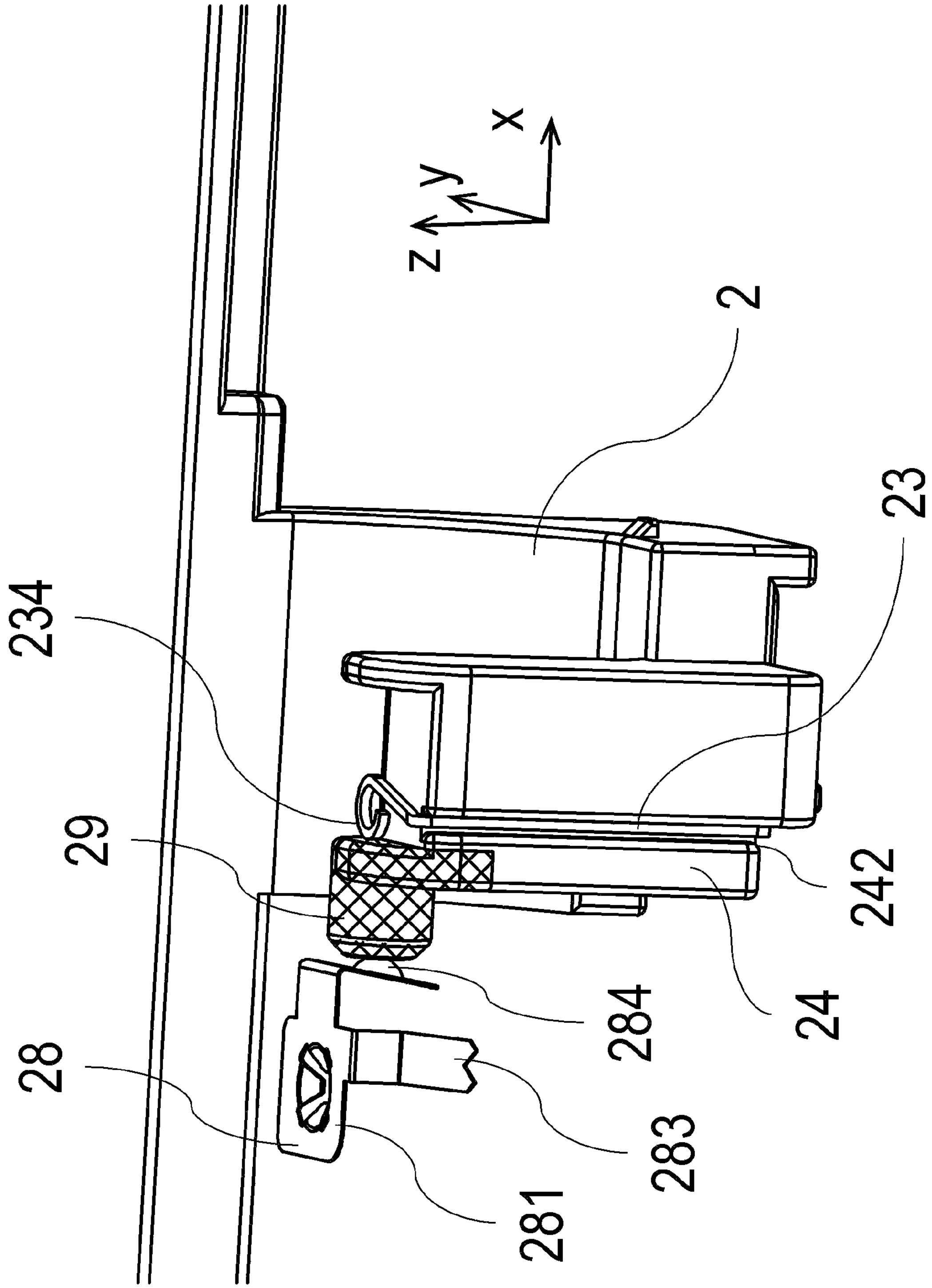
FIG. 15 is a perspective view illustrating the contact portion between the first conductive portion and the second conductive portion according to the third embodiment.
Figure 16:
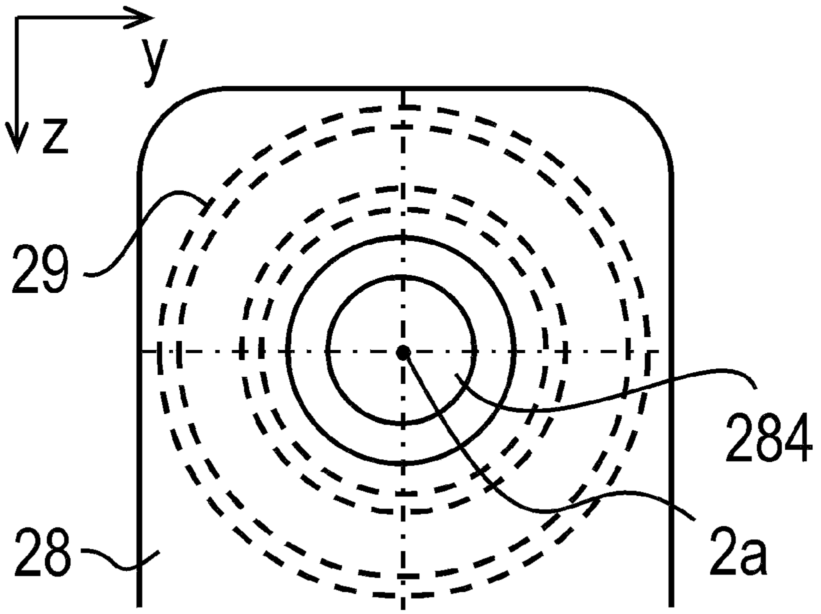
FIG. 16 is a front view illustrating the contact portion between the first conductive portion and the second conductive portion according to the third embodiment.

FIG. 14 is a perspective view illustrating the hinge portion 24 of the cartridge door 2 according to the third embodiment. FIG. 15 is a perspective view illustrating a connecting portion between the first conductive portion (the conductive support shaft 29) and a second conductive portion (the ground plate spring 28) according to the third embodiment. FIG. 16 is a front view illustrating the connecting portion between the first conductive portion (the conductive support shaft 29) and the second conductive portion (the ground plate spring 28) according to the third embodiment when viewed in a direction of the pivot axis line 2*a* of the cartridge door 2. In the third embodiment, a conductive portion for electrically protecting the switch substrate 20 or the like includes the switch wire spring 22, the relay wire spring 23, the conductive support shaft 29, and the ground plate spring 28. The conductive portion includes the first conductive portion which includes the switch wire spring 22, the relay wire spring 23, and the conductive support shaft 29 and moves integrally with the cartridge door 2 and the second conductive portion which includes the ground plate spring 28 and electrically connects the first conductive portion and the left frame 14.

The conductive support shaft 29 is formed of a conductive material with a low electric resistance to be integral with the cartridge door 2. The conductive support shaft 29 is axially supported by the upper cover 13 to allow the cartridge door 2 to pivot around the conductive support shaft 29 and be openably/closably supported with respect to the apparatus main body 1. The conductive support shaft 29 is in contact with each of the relay wire spring 23 and the ground plate spring 28 to electrically connect the relay wire spring 23 and the ground plate spring 28.

The conductive support shaft 29 is formed by molding a conductive resin integrally with the cartridge door 2 by, e.g., two-color molding. Alternatively, only a center portion of the conductive support shaft 29 may be formed of a conductive material by, e.g., insert molding. The conductive support shaft 29 is also axially supported by the upper cover 13 to be rotatable around the pivot axis line 2*a*.

An end portion of the relay wire spring 23 located on the ground plate spring 28 side is a conductive contact portion 234 formed in an annular shape. The conductive contact portion 234 is in contact with a surface of the conductive support shaft 29 which is opposite to a surface thereof facing the ground plate spring 28 in the direction of the pivot axis line 2*a*. The conductive contact portion 234 is wound so as to exert an elastic force in a direction in which the conductive support shaft 29 is pressed. Consequently, the elastic force with which the conductive contact portion 234 presses the conductive support shaft 29 acts in a direction parallel to the pivot axis line 2*a* and therefore, even when the cartridge door 2 is opened/closed to change the attitude thereof, the relay wire spring 23 and the conductive support shaft 29 are in contact with each other under a contact pressure equal to or more than a predetermined value.

Meanwhile, the ground plate spring 28 has a support shaft contact portion 284 which is in contact with a surface of the conductive support shaft 29 facing the ground plate spring 28 side in the direction of the pivot axis line 2*a*. The support shaft contact portion 284 is a portion formed by being bent from the fixed portion 281, similarly to the frame contact portion 283. The support shaft contact portion 284 has a hemispherical protruded portion protruded toward the conductive support shaft 29 side, and an apex of the protruded portion is in contact with the conductive support shaft 29. In the third embodiment, when viewed in the direction of the pivot axis line 2*a*, a contact portion of the support shaft contact portion 284 which is in contact with the conductive support shaft 29 is at a position overlapping the conductive support shaft 29 in the vicinity of the pivot axis line 2*a*. In addition, the support shaft contact portion 284 is in contact with a surface of the conductive support shaft 29 facing the direction of the pivot axis line 2*a*. In other words, in the third embodiment also, even when the attitude of the cartridge door 2 changes when the cartridge door 2 is opened/closed, a state of contact between the ground plate spring 28 and the conductive support shaft 29 does not substantially change to provide electrically stable connection therebetween. In addition, the support shaft contact portion 284 is wound so as to exert an elastic force in a direction in which the conductive support shaft 29 is pressed. By providing such a configuration, irrespective of the attitude of the cartridge door 2, the ground plate spring 28 and the conductive support shaft 29 are in contact with each other under the contact pressure equal to or more than the predetermined value. The support shaft contact portion 284 can be formed into the hemispherical protruded shape by, e.g., embossing a plate.

With the configuration in the third embodiment, due to the elastic force, the connecting portion between the individual members included in the conductive portion is configured such that the individual members are in contact with each other under the contact pressure equal to or more than the predetermined value, and consequently electric connection is stabilized. Specifically, in a contact portion between the relay wire spring 23 and the conductive support shaft 29, the elastic force of the conductive contact portion 234 causes the contact pressure equal to or more than the predetermined value. Meanwhile, in a contact portion between the ground plate spring 28 and the conductive support shaft 29, the elastic force of the support shaft contact portion 284 causes the contact pressure equal to or more than the predetermined value. Consequently, the conductive portion is electrically stably connected.

OTHER EMBODIMENTS

Each of the foregoing embodiments is an embodiment of the image forming apparatus of the present disclosure, and applications of the present disclosure are not limited to the mode described above. For example, the present disclosure is also applicable to a tandem-type color image forming apparatus including a plurality of the photosensitive member drums 31 and to a rotary-type color image forming apparatus including the single photosensitive member drum 31. The present disclosure is also applicable to an image forming apparatus using a transfer material carrying belt that carries and conveys a transfer material. In addition, the door included in the image forming apparatus is also not limited to the cartridge door 2 intended to attach/detach the cartridge unit 7, and may also be another door.

In each of the embodiments described above, the left frame 14 is used as the ground member, but a different member may also be used as the ground member. At this time, the ground plate spring 28 may also be in direct contact with the ground member or the ground plate spring 28 and the ground member may also be electrically connected via a relay member such as a wire spring. By providing such a configuration, it is also possible to form the left frame 14 not of a metal material, but of a resin material. Meanwhile, when a production cost increase due to addition of a novel member is to be avoided, a member included in the apparatus main body 1, such as the left frame 14, is preferably used as the ground member.

Furthermore, in each of the embodiments described above, the configuration is provided in which the ground plate spring 28 in the second conductive portion comes into contact with the first conductive portion, while pressing the first conductive portion, but the configuration is not limited to such a configuration in applying the present disclosure. For example, in a case of a configuration in which the elastic force of the relay wire spring 23 of the first conductive portion acts in the direction in which the second conductive portion is pressed as in the first embodiment and the second embodiment, the member included in the second conductive portion need not necessarily be an elastic member. In such a configuration also, the contact portion between the first conductive portion provided on the door and the second conductive portion provided on the apparatus main body is provided at a position overlapping the pivotal support shaft of the door when viewed in the direction of the pivot axis line of the door, the state of contact between the first conductive portion and the second conductive portion is stabilized. In addition, by including an elastic member which exerts an elastic force such that either one of the first conductive portion and the second conductive portion presses another to come into contact with the other, the contact pressure between the first conductive portion and the second conductive portion is held at the predetermined value or more to stabilize electric connection between the first conductive portion and the second conductive portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-164244, filed on Oct. 12, 2022, which is hereby incorporated by reference herein in its entirety.

What is claimed is:

1. An image forming apparatus comprising:

an apparatus main body that includes a ground member having the same potential as that of a ground;

a door configured to be opened/closed and to pivot around a pivotal support shaft with respect to the apparatus main body;

an electric component that is provided on the door; and a conductive portion that is electrically connected to the ground member to electrically protect the electric component, wherein the conductive portion includes a first conductive portion that is provided on the door and that is configured to move integrally with the door as the door pivots, and includes a second conductive portion that is provided on the apparatus main body and is electrically connected to each of the first conductive portion and the ground member, wherein the first conductive portion includes a wire spring having a contact portion that is configured to come into contact with the second conductive portion, and is configured to exert an elastic force so as to press the second conductive portion, wherein the contact portion is at a position overlapping a pivot axis line of the pivotal support shaft of the door in a case of being viewed in a direction of the pivot axis line of the door, and wherein the contact portion of the wire spring linearly extends along the pivot axis line of the door.

2. The image forming apparatus according to claim 1, wherein the second conductive portion includes a plate spring which is fixed to the apparatus main body, and is configured to come into contact with the wire spring and to exert a plate spring elastic force so as to press the wire spring.

3. The image forming apparatus according to claim 1, wherein the pivotal support shaft of the door has a containing portion which contains the wire spring in the containing portion such that the wire spring extends over the pivot axis line of the pivotal support shaft.

4. The image forming apparatus according to claim 3, wherein the containing portion is a hole provided in the pivotal support shaft, the wire spring has a contained portion which extends in the direction of the pivot axis line, and the contact portion is located on a leading end side of the contained portion, and wherein, while being in contact with an inner peripheral surface of the hole, the wire spring is bent inside the hole and extends to outside of the hole so as to extend on the pivot axis line.

5. The image forming apparatus according to claim 3, wherein the containing portion is a notch formed from an outer peripheral surface of the pivotal support shaft through the pivotal support shaft in the direction of the pivot axis line beyond a center of the pivoting of the door around the pivotal support shaft.

6. The image forming apparatus according to claim 1, wherein the electric component is a substrate having an electric element, and wherein the first conductive portion further includes a conductive member extending so as to surround the electric element.

7. The image forming apparatus according to claim 1, wherein the ground member is a frame constituting the apparatus main body.

8. The image forming apparatus according to claim1, wherein a groove is formed in the second conductive portion, and wherein the contact portion is fitted to the groove.

9. An image forming apparatus comprising:

an apparatus main body that includes a ground member having the same potential as that of a ground;

a door configured to be opened/closed and to pivot around a pivotal support shaft with respect to the apparatus main body;

an electric component that is provided on the door; and a conductive portion that is electrically connected to the ground member to electrically protect the electric component, wherein the conductive portion includes a first conductive portion that is provided on the door and that is configured to move integrally with the door as the door pivots, and includes a second conductive portion that is provided on the apparatus main body and is electrically connected to each of the first conductive portion and the ground member, wherein the second conductive portion includes a plate spring having a contact portion that is configured to come into contact with the first conductive portion, is configured to exert an elastic force so as to press the first conductive portion, and is configured to electrically connect the first conductive portion and the second conductive portion, wherein the contact portion is at a position overlapping the pivotal support shaft of the door in a case of being viewed in a direction of a pivot axis line of the door, wherein the plate spring has a fixed portion which is fixed to the apparatus main body, and wherein the contact portion is bent from the fixed portion to come into contact with the first conductive portion.

10. The image forming apparatus according to claim 9, wherein the pivotal support shaft is formed of a conductive material to be integral with the door, wherein the first conductive portion includes the pivotal support shaft, and wherein the plate spring is configured to come into contact with a surface of the pivotal support shaft facing the direction of the pivot axis line.

11. The image forming apparatus according to claim 9, wherein the electric component is a substrate having an electric element, and wherein the first conductive portion includes a conductive member extending so as to surround the electric element.

12. The image forming apparatus according to claim 9, wherein the ground member is a frame constituting the apparatus main body.

13. An image forming apparatus comprising:

an apparatus main body that includes a ground member having the same potential as that of a ground;

a door configured to be opened/closed and to pivot around a pivotal support shaft with respect to the apparatus main body;

a substrate having an electric element that is provided on the door; and a conductive portion that is electrically connected to the ground member to electrically protect the substrate, wherein the conductive portion includes a first conductive portion that is provided on the door and that is configured to move integrally with the door as the door pivots, and includes a second conductive portion that is provided on the apparatus main body and is electrically connected to each of the first conductive portion and the ground member, wherein the first conductive portion includes a first wire spring extending so as to surround the electric element, wherein the first conductive portion further includes a second wire spring having a contact portion that is configured to come into contact with the second conductive portion, is configured to exert an elastic force so as to press the second conductive portion, and is configured to electrically connect the first conductive portion and the second conductive portion, wherein the contact portion is at a position overlapping the pivotal support shaft of the door in a case of being viewed in a direction of a pivot axis line of the door, and wherein the first wire spring is configured to exert an elastic force in a direction in which the second wire spring is pressed to come into contact with the second wire spring and to be electrically connected to the second wire spring.

14. The image forming apparatus according to claim 13, wherein the ground member is a frame constituting the apparatus main body.

* * * * *